US009769797B2

(12) United States Patent
Johansson et al.

(10) Patent No.: US 9,769,797 B2
(45) Date of Patent: Sep. 19, 2017

(54) SELF BACKHAULING IN LTE

(71) Applicant: TELEFONAKTIEBOLAGET L M ERICSSON (PUBL), Stockholm (SE)

(72) Inventors: Niklas Johansson, Sollentuna (SE); Johan Lundsjö, Spånga (SE); Gunnar Mildh, Sollentuna (SE); András Rácz, Budapest (HU); Christian Hoymann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/449,107

(22) Filed: Jul. 31, 2014

(65) Prior Publication Data
US 2016/0057734 A1 Feb. 25, 2016

Related U.S. Application Data

(63) Continuation of application No. 12/990,046, filed as application No. PCT/SE2008/051004 on Sep. 9, 2008, now Pat. No. 8,797,952.

(60) Provisional application No. 61/048,980, filed on Apr. 30, 2008.

(51) Int. Cl.
| H04L 12/28 | (2006.01) |
| H04W 72/04 | (2009.01) |
| H04W 92/20 | (2009.01) |
| H04L 12/741 | (2013.01) |
| H04L 12/911 | (2013.01) |
| H04W 80/04 | (2009.01) |

(52) U.S. Cl.
CPC .............. *H04W 72/04* (2013.01); *H04L 45/74* (2013.01); *H04L 47/825* (2013.01); *H04W 92/20* (2013.01); *H04W 80/04* (2013.01)

(58) Field of Classification Search
CPC ........... H04W 28/021; H04W 28/0252; H04W 28/0263; H04W 28/0257; H04W 28/085
See application file for complete search history.

(56) References Cited

U.S. PATENT DOCUMENTS

| 2001/0043571 | A1* | 11/2001 | Jang | .................... | H04L 12/1813 370/260 |
| 2008/0192677 | A1* | 8/2008 | Abusch-Magder | ... | H04W 8/082 370/328 |
| 2009/0016334 | A1* | 1/2009 | Forsberg | ............... | H04W 28/06 370/389 |

* cited by examiner

Primary Examiner — Andrew Chriss
Assistant Examiner — Kenan Cehic

(57) ABSTRACT

A system includes a self-backhauled eNodeB which communicates via a radio interface with an anchor eNodeB, where the self-backhauled eNodeB is made reachable in an operator's network via a serving gateway and where the serving gateway of the self-backhauled eNodeB owns an IP address associated with the self-backhauled eNodeB. The system receives a packet destined for the self-backhauled eNodeB and classifies the packet to a bearer associated with a self-backhauled link to the self-backhauled eNodeB.

24 Claims, 28 Drawing Sheets

SELF BACKHAULING IN LTE

PRIORITY CLAIM UNDER 35 U.S.C. 119(e)

This application is a continuation of U.S. patent application Ser. No. 12/990,046, filed Oct. 28, 2010, entitled "Self-Backhauling in LTE" which is the National Stage filing of International Application No. PCT/SE2008/051004, filed Sep. 9, 2008, entitled "Self-Backhauling in LTE," which claims benefit of U.S. Provisional Application No. 61/048,980, filed Apr. 30, 2008, entitled. "Method and Arrangement in a Telecommunication System," both of which are incorporated by reference in their entirety.

TECHNICAL FIELD

Implementations described herein relate generally to wireless communication systems and, more particularly, to wireless communication systems employing one or more self backhauled base stations.

BACKGROUND

The $3^{rd}$ Generation Partnership Project (3GPP) standardization body is currently working on the specification of the evolved 30 mobile system, where the core network related evolution of the architecture is often referred to as SAE (System Architecture Evolution) or Evolved Packet Core (EPC), while the Radio Access Network (RAN) evolution is referred to as Long Term Evolution (LTE) or Evolved Universal Terrestrial Radio Access Network (E-UTRAN). The name SAE/LTE or Evolved Packet System (EPS) refers to the overall system. The Release 8 specification of the 3GPP standard, which is to be completed in 2008, will include the specification of the SAE/LTE evolved system. For an overall description of the LTE part of the architecture see 3GPP TS 36.300 "E-UTRA, E-UTRAN Overall Description" and for the SAE pan see 3GPP TS 23.401 "General Packet Radio Service (GPRS) Enhancements for E-UTRAN Access."

The SAE/LTE architecture is also often called as a two-node architecture, as logically there are only two nodes involved—both in the user and control plane paths—between the User Equipment (UE) and the core network. These two nodes are the base station, called eNodeB in 3GPP terminology and the Serving Gateway (S-GW) in the user plane, and the Mobility Management Entity (MME) in the control plane. There may be multiple S-GW and MME nodes in a network.

The S-GW executes generic packet processing functions similar to router functions, including packet filtering and classification. The MME terminates the Non-Access Stratum (NAS) signaling protocols with the UE and maintains the UE context including the established bearers, the security context as well as the location of the UE.

In the LTE architecture, the radio link specific protocols, including Radio Link Control (RLC) and Medium Access Control (MAC) protocols are terminated in the eNodeB. In the control plane, the eNodeB uses the Radio Resource Control (RRC) protocol to execute the longer time scale radio resource control toward the UE, such as, for example, the establishment of radio bearers with certain Quality of Service (QoS) characteristics, the control of UE measurements or the control of handovers.

The network interface between the eNodeB and the EPC network is called the S1 interface, which has a control plane part (S1-CP) connecting to the MME and a user plane part (S1-UP) connecting to the S-GW. The user plane part of the S1 interface is based on the GPRS Tunneling Protocol (GTP). The tunneling mechanism is needed in order to ensure that the Internet Protocol (IP) packets destined to the UE can be delivered to the correct eNodeB where the UE is currently located. For example, the original IP packet is encapsulated into an outer IP packet that is addressed to the proper eNodeB.

The S1 control plane protocol is called S1-AP and it is carried on top of Stream Control Transmission protocol (SCTP)/IP. The MME uses the S1-AP protocol to talk to the eNodeB, e.g., to request the establishment of radio bearers to support the QoS services for the UE. There also is a network interface between neighbor eNodeBs, which is called the X2 interface, and it has a similar protocol structure as the S1 interface with the exception that the control protocol is called X2-AP. The X2 interface is primarily used for the execution of the handover of a UE from one eNodeB to the other but it is also used for the inter-cell coordination of other Radio Resource Management functions, such as Inter-Cell Interference Coordination. During a handover execution, the source eNodeB talks to the target eNodeB via the X2-AP protocol to prepare the handover and during the handover execution it forwards the pending user plane packets to the target eNodeB, which are to be delivered to the UE once it has arrived at the target eNodeB. The packet forwarding is done via the X2 user plane which is using the GTP tunneling protocol similar to the user plane on the S1 interface.

The network infrastructure that is used to connect the different network nodes, e.g., the eNodeB's, MME's and S-GW's, is an IP based transport network, which can include L2 networks with different technologies, i.e., SDH links, Ethernet links, Digital Subscriber Line (DSL) links or Microwave links, etc. The type of transport network and L2 technologies employed is a deployment issue, depending on the availability, cost, ownership, operator preferences, etc., of such networks in the particular deployment scenario. However, it is generally true that the costs related to the transport network often play a significant part of the overall operation costs of the network.

In a further enhancement of the LTE system, called LTE-Advanced, 3GPP discusses possible solutions to use the LTE radio interface from an eNodeB not only for serving UEs but also for serving as a backhaul link to connect to other eNodeBs. That is, an eNodeB can provide the transport network connectivity for other eNodeBs utilizing a LTE radio connection via the other eNodeBs. This method is called "self-backhauling" since the radio link itself is used also as a transport link for some of the base stations. In an LTE system employing, self-backhauling, an eNodeB that is connected to the network via a radio connection is referred to as self-backhauled eNodeB, or B-eNodeB for short. While the eNodeB that is providing the backhaul radio connection for other eNodeB(s) is called the anchor eNodeB, or A-eNodeB for short ("eNodeB," by itself refers to regular eNodeBs, which are neither self-backhauled nor anchor eNodeBs).

SUMMARY

Currently, there exist no known solutions for realizing self-backhauling in LTE. Exemplary embodiments described herein provide means to realize self-backhauling in LTE by exposing and making the self-backhauled eNodeB visible/reachable on the service level in the operator's network, meaning that the self-backhauled eNodeB can be treated/served by the same mechanisms (SAE/LTE signaling methods, etc.) as is used fix serving regular UEs. A mechanism to achieve this is to expose the IP address of the self-backhauled eNodeB to the operator's network making it available for the same service layer mechanisms already used in SAE/LTE.

Exemplary embodiments described herein provide two general approaches for realizing self-backhauling in LTE. In an encapsulation approach, the self-backhauled eNodeB may be treated as a UE from the standpoint of the anchor eNodeB, which handles traffic to/from its own UEs (i.e., UEs served by the self-backhauled eNodeB). In a network routing approach, the anchor eNodeB may be seen as part of the transport network, acting like an IT router in between the self-backhauled eNodeB and the core network. The exemplary embodiments described herein, thus, provide as solution to implement self-backhauling in the current LTE architecture with minimal modification of existing interfaces, protocols and network nodes.

According to one aspect, a method may be implemented in a system that includes a self-backhauled eNodeB which communicates via a radio interface with an anchor eNodeB, where the self-backhauled eNodeB is made reachable in an operator's network via a serving gateway and where the serving gateway of the self-backhauled eNodeB owns an IP address associated with the self-backhauled eNodeB. The method may include receiving a packet destined for the self-backhauled eNodeB. The method any further include classifying the packet to a bearer associated with a self-backhauled link to the self-backhauled eNodeB.

According to a further aspect, a method may be implemented in a first gateway that serves a self-backhauled eNodeB in a wireless network, where the self-backhauled eNodeB comprises a node that communicates with the wireless network via a radio interface to an anchor eNodeB of the wireless network. The method tiny include receiving a packet destined for a user equipment (UP that is being served by the self-backhauled eNodeB and classifying the packet to map the packet to a bearer associated with the UE based on the classification. The method may thither include using a tunneling, protocol to tunnel a packet towards the anchor eNodeB that will transmit the packet to the self-backhauled eNodeB via a radio interface.

According to another aspect, a first base station in a wireless network that serves a second base station via a radio interface may include a network interface configured to receive encapsulated packets tunneled from a serving gateway via a transport network, where the encapsulated packets are destined far a user equipment (UE) served by the second base station. The first base station may farther include a processing unit configured to decapsulate the packets or to perform packet classification; and a transmitter configured to send the packets on the radio interface to the second base station for delivery to the UE.

According to a further aspect, a system associated with a cellular network may include a first base station connected to a transport network and may be configured to: receive packets tunneled via the transport network, where the packets are destined for a user equipment (UE) that is served by a second base station, and send the packets on a radio interface to the second base station. The second base station may be configured to: receive the packets on the radio interface from the first base station, decapsulate the tunneled packets, and send the packets on the radio interface to the UE.

According to yet another aspect, a method any be implemented in a system that includes a self-backhauled eNodeB which communicates via a radio interface with an anchor eNodeB, where the self-backhauled eNodeB is made reachable in an operator's network via a serving gateway and where the anchor eNodeB acts as a proxy between the operator's network and the self-backhauled by translating control plane messages and by switching data packets such that the self-backhauled eNodeB is hidden from the operator's network. The method may include receiving, at the self-backhauled eNodeB, a data packet destined for a user equipment (UE) and mapping the data packet them an incoming tunnel to an outgoing tunnel. The method may further include receiving a control message destined for the UE and modifying elements of the control message while copying other elements in the control message.

DETAILED DESCRIPTION

The following detailed description of the invention refers to the accompanying drawings. The same reference numbers in different drawings may identity the same or similar elements. Also, the following detailed description does not limit the invention.

Figure 1:
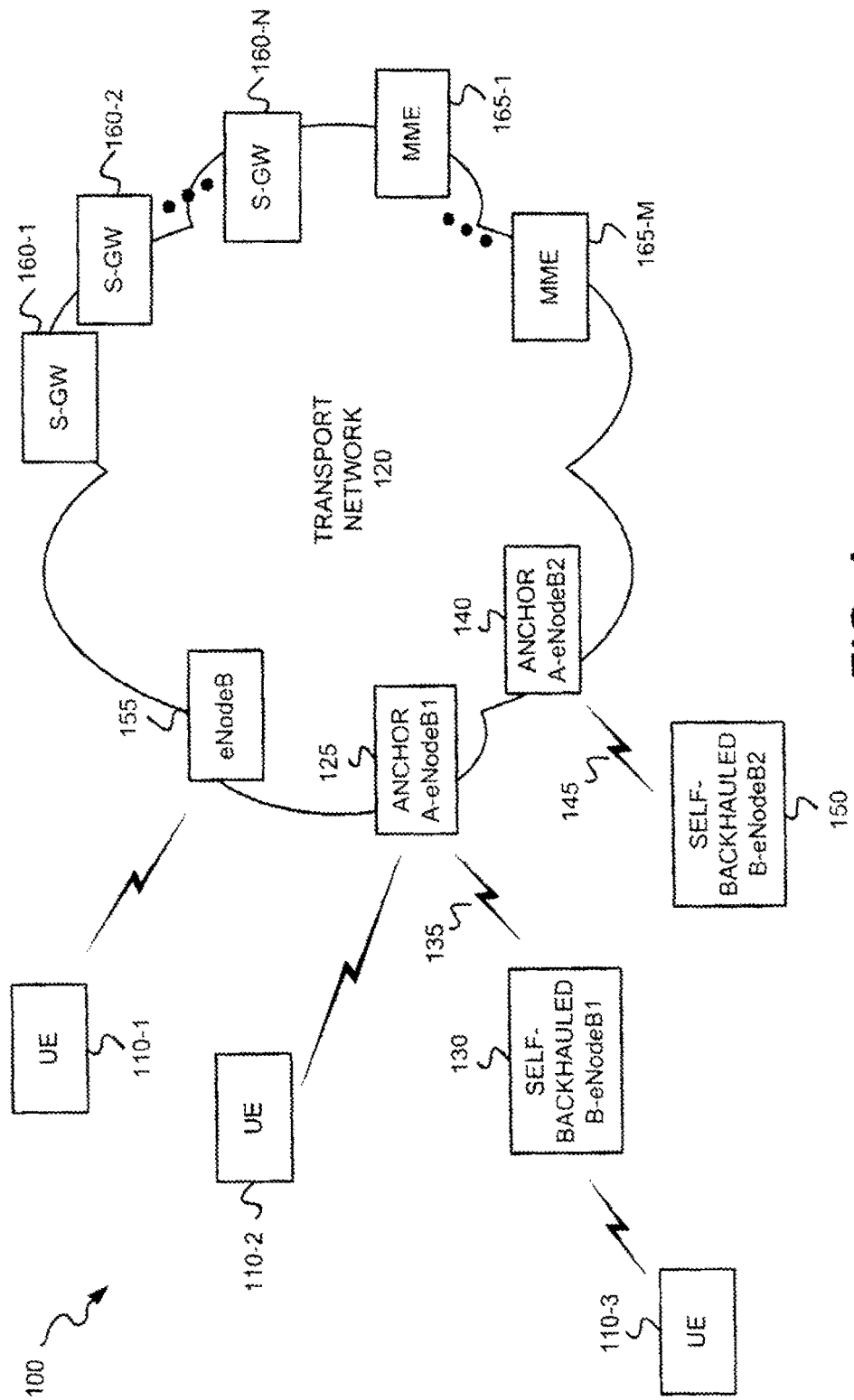
FIG. 1 illustrates an exemplary communications system that includes one or more self-backhauled eNodeBs.

FIG. 1 illustrates an exemplary communications system 100 that may include UE devices 110-1, 110-2 and 110-3 connected to an SAE/LTE network, which may include eNodeB nodes, MME nodes, and S-GW nodes, all connected to a transport network 120. As shown in FIG. 1, system 100 may include an anchor eNodeB 125 (A-eNodeB1) that connects to a self-backhauled eNodeB (B-eNodeB1) via a radio interface 135 and an anchor eNodeB 140 (A-eNodeB2) that connects to a self-backhauled eNodeB (B-eNodeB2) via a radio interface 145. Anchor eNodeB 125 and anchor eNodeB 140 may serve UEs in addition to providing a "backhaul" link(s) to connect to other eNodeBs, such as self-backhauled eNodeB 130 and self-backhauled eNodeB 150. Anchor eNodeB 125 may, thus, use radio interface 135 to provide a transport link for self-backhauled eNodeB 130 and anchor eNodeB 140 may use radio interface 145 to provide a transport link for self-backhauled eNodeB 150. A "self-backhauled eNodeB" as referred to herein includes an eNodeB that is connected to transport network 120 via a radio connection. An "anchor eNodeB" as referred to herein includes an eNodeB that provides a backhaul radio connection for one or more other eNodeBs (e.g., for self-backhauled eNodeBs).

Two anchor eNodeBs and self-backhauled eNodeBs are depicted in FIG. 1 for purposes of simplicity. System 100, however, may include fewer or more anchor eNodeBs and self-backhauled eNodeBs than those shown in FIG. 1. System 100 may further include one or more other eNodeBs eNodeB 155 shown in FIG. 1) in addition to anchor eNodeBs 125 and 140, where the other eNodeBs may not provide back-haul links to other eNodeBs. These other eNodeBs (e.g., eNodeB 155) include eNodeBs that are neither anchor eNodeBs nor self-backhauled eNodeBs.

System 100 may additionally include one or more serving gateways (S-GW) 160-1 through 160-N, and one or more mobility management entities (MMEs) 165-1 through 165-M. In some implementations described herein, there may be one S-GW logical function (e.g., S-GW 160-1) associated with a given B-eNodeB and a separate S-GW function (e.g., S-GW 160-2) associated with the UE that is being served by the B-eNodeB. In some implementations, these two logical functions may be co-located in the same physical node. Additionally. S-GWs 160-1 through 160-N may further include Packet Data Network Gateway (P-GW) logical functionality. Alternatively, the P-GW logical functionality may be located in separate physical nodes. S-GWs 160-1 through 160-N may include logical nodes that terminate UE connections (called EPS bearers in 3GPP terminology). The EPS bearer may include the connection provided by the SAE/LTE system in between the UE and the outside network (e.g., the Internet). This connection to the outside network may be provided by the P-GW, which is allocated the UE IP address. The EPS bearer may also be the means by which different packet flows can be identified in order to provide them with different Quality of Service (QoS) treatment, MMEs 165-1 through 165-M may include functionality for handling UE mobility within system 100.

UE devices 110-1 through 110-3 may include, for example, a cellular radiotelephone, a personal digital assistant (PDA), a Personal Communications Systems (PCS) terminal, a laptop computer, a palmtop computer, or any other type of device or appliance that includes a communication transceiver that permits UE devices 110 to communicate with other devices via a wireless link. The PCS terminal may, for example, combine a cellular radiotelephone with data processing, facsimile and data communications capabilities. The PDA may include, leer example, a radiotelephone, a pager, an Internet/intranet access device, a web browser, an organizer, calendars and/or a global positioning system (GPS) receiver. UE devices 110 may be referred to as a "pervasive computing" device.

Transport network 120 may include one or more networks of any type, including a local area network (LAN); a wide area network (WAN); a metropolitan area network (MAN); a satellite network; an intranet, the Internet; or a combination of networks. eNodeBs 125-155, S-GWs 160-1 through 160-N, and MMEs 165-1 through 165-M may reside in an SAE/LTE network and may be connected via transport network 120

Figure 2:
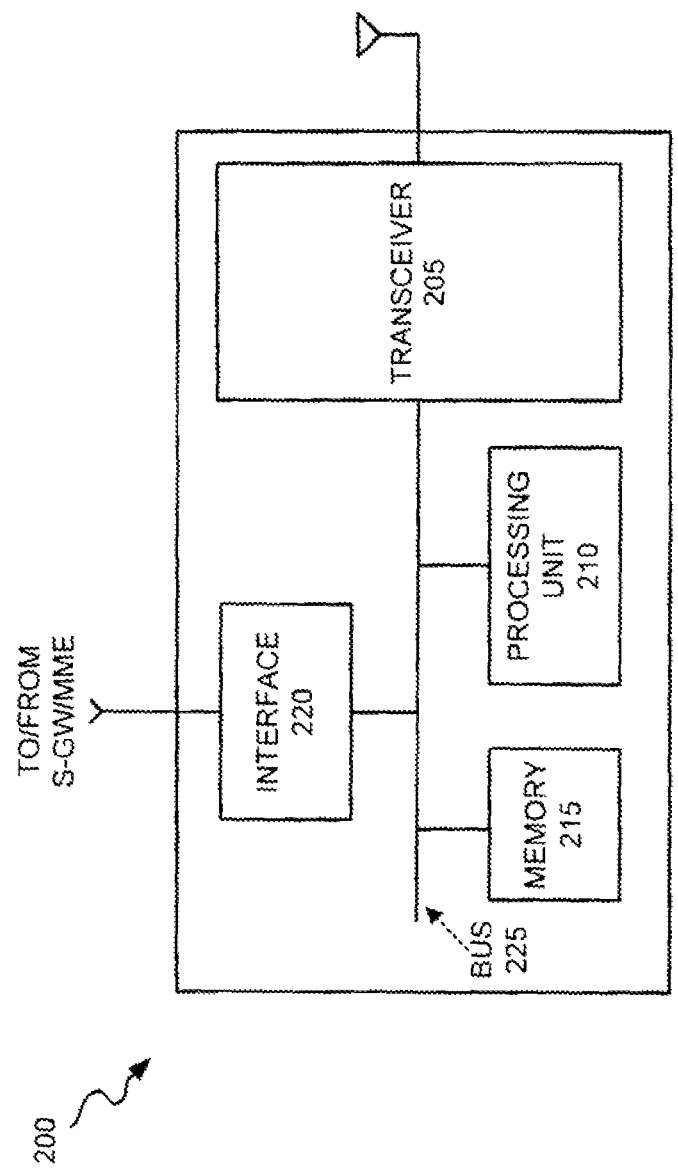
FIG. 2 illustrates exemplary components of a device that may correspond to the anchor eNodeBs and/or self-backhauled eNodeBs of FIG. 1.

FIG. 2 illustrates an exemplary implementation of a device 200, that may correspond to anchor eNodeBs 125 and 140, self-backhauled eNodeBs 130 and 150 and eNodeB 155. Device 200 may include a transceiver 205, a processing unit 210, a memory 215, an interface 220 and a bus 225. Device 200 may omit a wired interface 220 when device 200 corresponds to self-backhauled eNodeBs 130 or 150 (though device NO may still have a logical interface to a MEM 165 and/or a S-GW 160).

Transceiver 205 may include transceiver circuitry the transmitting and/or receiving symbol sequences using radio frequency signals via one or more antennas. Processing unit 210 troy include a processor, microprocessor, or processing logic that may interpret and execute instructions. Processing unit 210 may perform all device data processing functions. Memory 215 may provide permanent, semi-permanent, or temporary working storage of data and instructions for use by processing unit 210 in performing device processing functions. Memory 215 may include read only memory (ROM), random access memory (RAM), large-capacity storage devices, such as a magnetic and/or optical recording medium and its corresponding drive, and/or other types of memory devices. Interface 220 may include circuitry for interfacing with a link that connects to transport network 120. Bus 225 may interconnect the various components of device 200 to permit the components to communicate with one another.

The configuration of components of device 200 illustrated in FIG. 2 is the illustrative purposes only. Other configurations with more, fewer, or a different arrangement of components tiny be implemented.

Figure 3A:
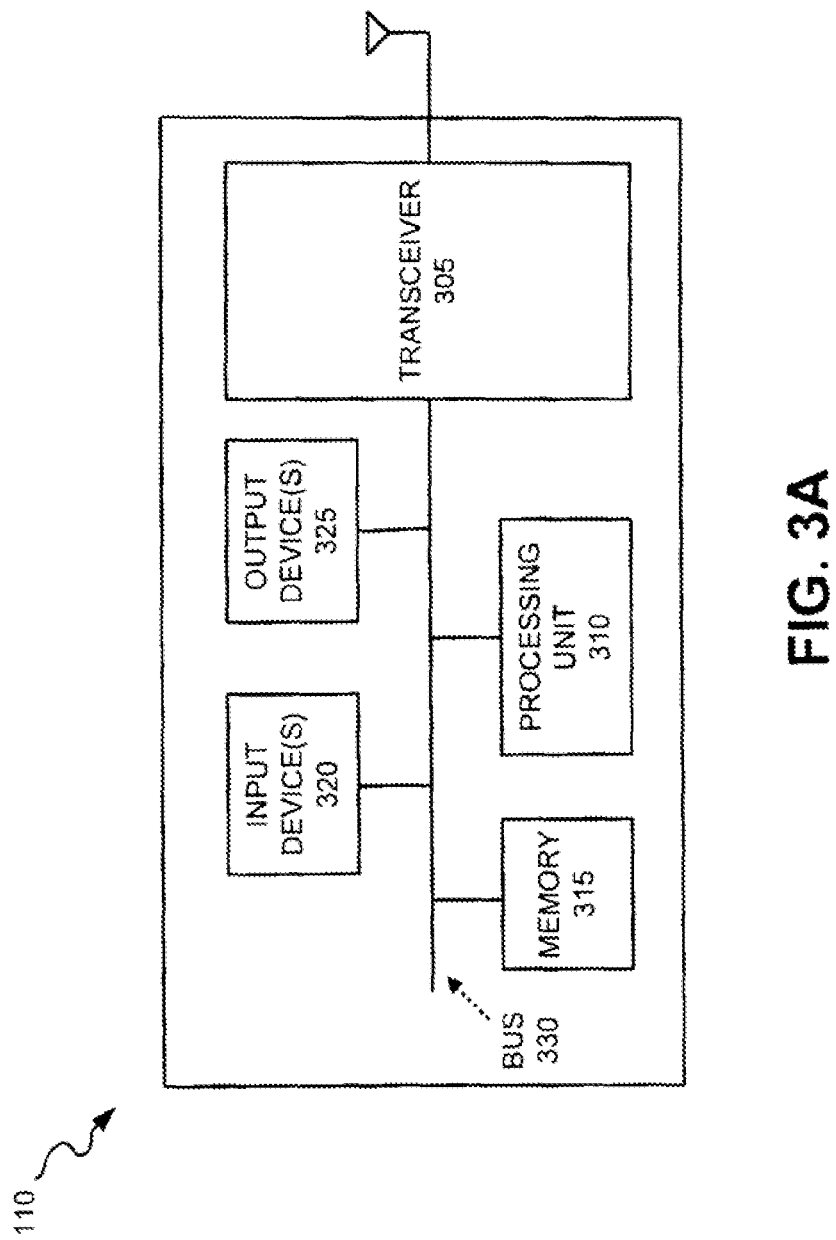
FIG. 3A illustrates exemplary components of a UE of FIG. 1.

FIG. 3A illustrates exemplary components of UE 110. UE 110 may include a transceiver 305, a processing unit 310, a memory 315, an input device(s) 320, an output, device(s) 325, and a bus 330.

Transceiver 305 may include transceiver circuitry for transmitting and/or receiving symbol sequences using radio frequency signals via one or more antennas. Processing unit 310 may include a processor, microprocessor, or processing logic that may interpret and execute instructions. Processing unit 310 may perform all data processing functions for inputting, outputting, and processing of data including data buffering and device control functions, such as call processing control, user interface control, or the like.

Memory 315 may provide permanent, semi-permanent or temporary working storage of data and instructions for use by processing unit 310 in performing device processing functions. Memory 315 may include ROM. RAM, large-capacity storage devices, such as a impede and/or optical recording medium and its corresponding drive, and/or other types of memory devices. Input device(s) 320 may include mechanisms for entry of data into UE 110. For example, input device(s) 320 may include a key pad (not shown), a microphone (not shown) or a display unit (not shown). The key pad may permit manual user entry of data into UE 110. The microphone may include mechanisms for converting auditory input into electrical signals. The display unit tiny include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 325 may include mechanisms for outputting data in audio, video and/or hard copy format. For example, output device(s) 325 may include a speaker (not shown) that includes mechanisms (Or converting electrical signals into auditory output. Output device(s) 325 may thither include a display unit that displays output data to the user. For example, the display unit may provide a graphical user interface that displays output data to the user. Bus 330 may interconnect the various components of UE 110 to permit the components to communicate with one another.

The configuration of components of UE 110 illustrated in FIG. 3A is for illustrative purposes only. Other configurations with more, fewer, or a different arrangement of components may be implemented.

Figure 3B:
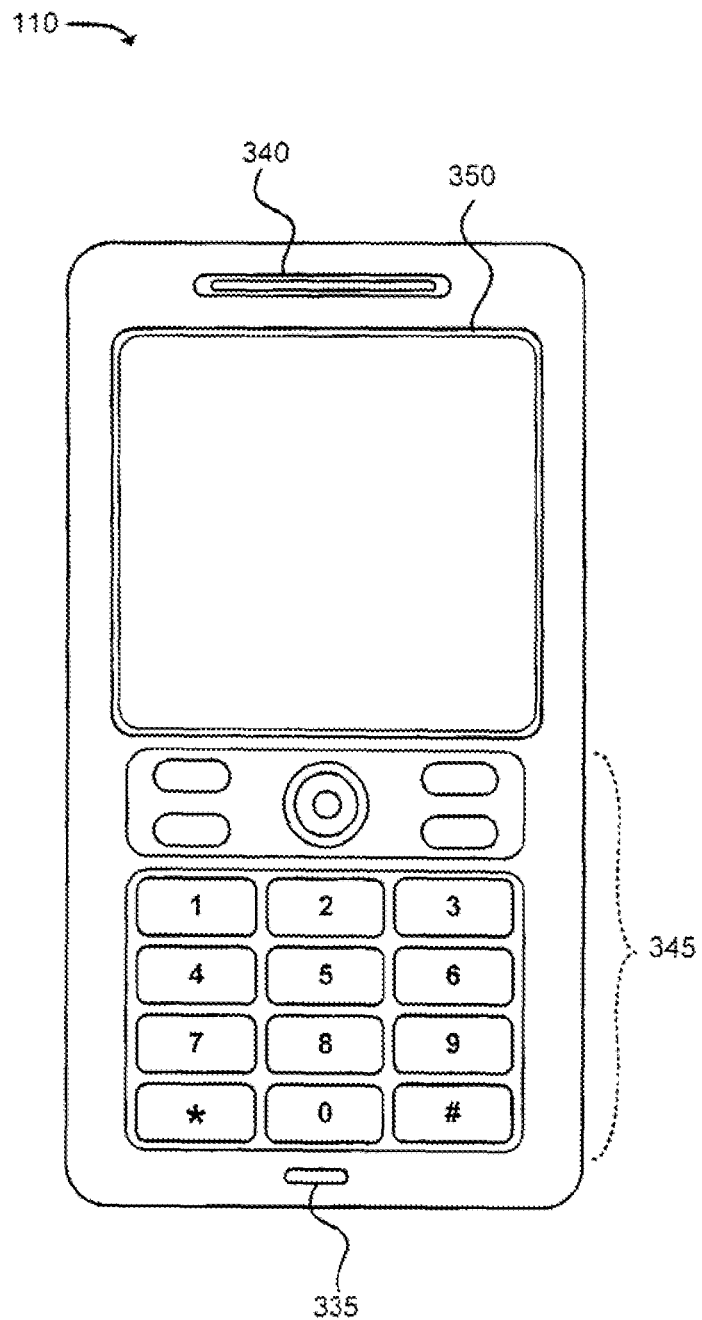
FIG. 3B illustrates an exemplary implementation of the UP of FIG. 3A where the UE includes a cellular radiotelephone.

FIG. 3B illustrates an exemplary implementation of UE 110 in which UE 110 includes a cellular radiotelephone. As shown in FIG. 3B, the cellular radiotelephone may include a microphone 335 (e.g., of input device(s) 320) for entering audio information into UE 110, as speaker 340 (e.g., of output device(s) 325) (Or providing an audio output from UE 110, a keypad 345 of input device(s) 320) for manual entry of data or selection of device functions, and a display 350 (e.g., of input device(s) 320 or output device(s) 325) that may visually display data to the user and/or which may provide a user interface that the user may use to enter data or to select device functions (in conjunction with keypad 345).

As described herein, an encapsulation approach my be employed for sending packets to UEs via a self-backhauled B-eNodeB. In this encapsulation approach, packets may be sent between the self-backhauled B-eNodeB and the UEs served by self-backhauled B-eNodeB encapsulated in a radio connection of the self-backhauled B-eNodeB (acting as a virtual UE). Two exemplary encapsulation approaches are described below and differ primarily in the way packets are muted between the S-GW for the UE and the S-GW for the B-eNodeB. In one exemplary embodiment, the self-backhauled B-eNodeB may be allocated an IP address at its S-GW and when the S-GW of the UE sends the GTP packets, having a destination IP address of the B-eNodeB, the packets may automatically find their way to the correct S-GW by regular IP routing due to the B-eNodeB IP address being associated with its S-GW. In a second exemplary embodiment, routing between the S-GW for the self-backhauled B-eNodeB and the S-GW for the UE may use GTP tunneling in this exemplary embodiment, a GTP tunnel may be established between the two S-GW nodes corresponding to each bearer of the B-eNodeB. In both of the exemplary encapsulation approaches, encapsulation tunneling may be employed with the outer tunnel corresponding to the B-eNodeB carrying the inner tunnels corresponding to the UE connecting via the B-eNodeB.

Figure 4:
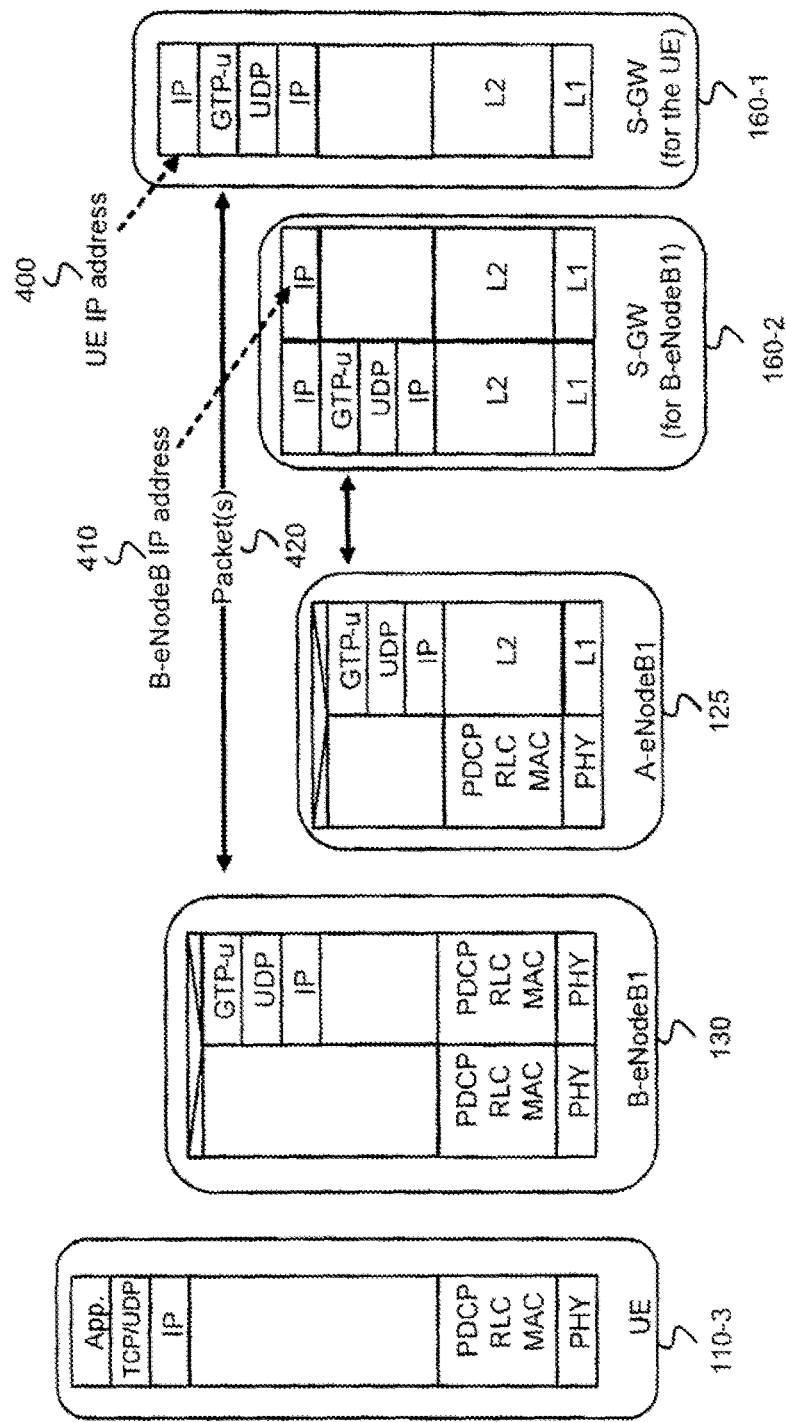
FIG. 4 illustrates an S1 interface User Plane (S1-UP) protocol architecture associated with a first exemplary embodiment.
Figure 5:
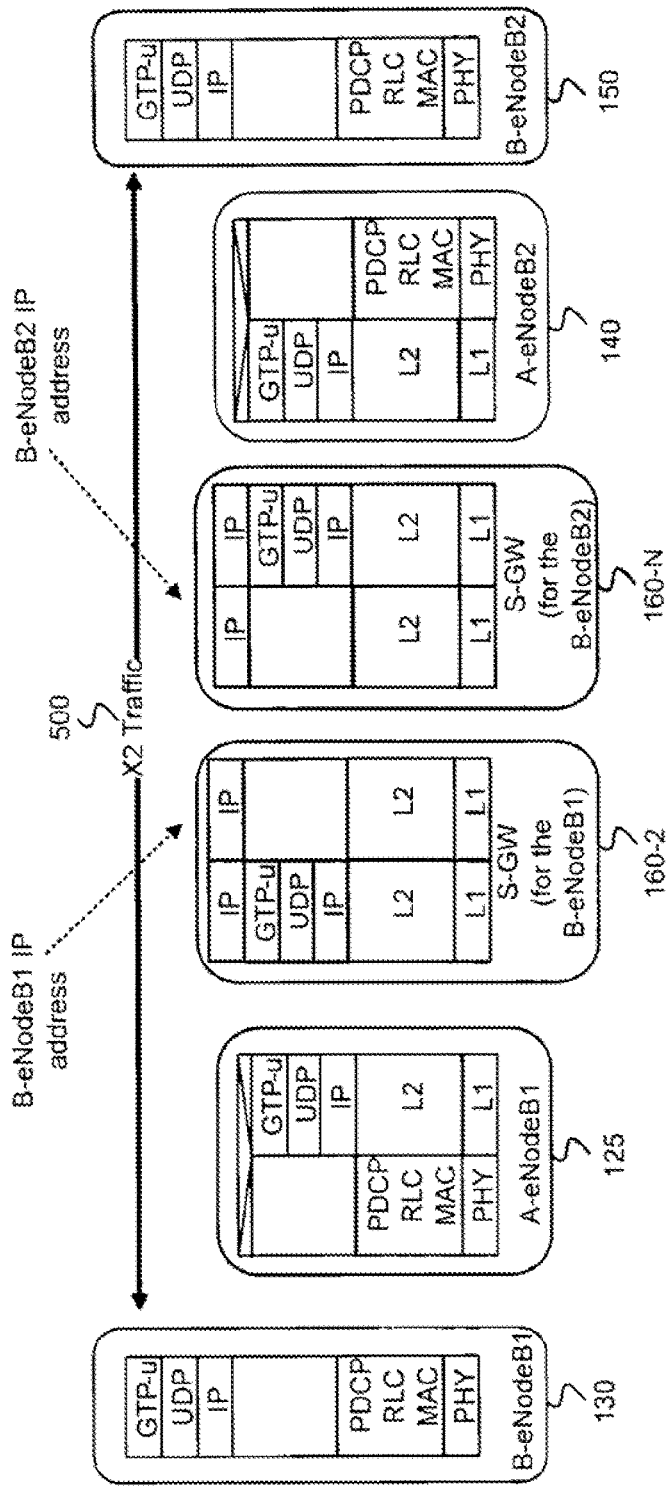
FIG. 5 further depicts an X2 interface UP (X2-UP) protocol architecture associated with the first exemplary embodiment.

FIGS. 4 and 5 depict a first exemplify embodiment in which the self-backhauled B-eNodeB may be allocated an IP address at its S-GW and packets from the S-GW of the UE find their way to a correct S-GW by regular IP routing. FIG. 4 depicts an S1 interface User Plane (S1-UP) protocol architecture associated with the first exemplify embodiment. As shown in FIG. 4, an IP address 400 associated with the UE and the UE's S-GW 160-1, and an IP address 410 associated with B-eNodeB1 130 and B-eNodeB1 130's S-GW 160-2, may be used for IP routing of packets 420 from S-GW 160-1 to S-GW 160-2 for delivery to UE 110-3 via A-eNodeB1 125 and B-eNodeB1 130. FIG. 5 further depicts an X2 interface UP (X2-UP) protocol architecture associated with the first exemplary embodiment. An X2 interface, as referred to herein, may be defined between two neighboring eNodeBs and may be used for handover control and for other Radio Resource Management (RRM) coordination functions. As shown in FIG. 5, both B-eNodeBs (e.g., B-eNodeB1 130 and B-eNodeB2) involved in the handoff of a UE (e.g., UE 110-3) from one self-backhauled B-eNodeB to another self-backhauled B-eNodeB, and at two ends of an X2 interface, may have their own S-GW logical nodes. For example, as shown in FIG. 5, B-eNodeB1 130 have its own S-GW 160-2 and B-eNodeB2 150 may have its own S-GW 160-N. X2 traffic 500 may be routed via S-GW 160-2 and S-GW 160-N since the IP address of the self-backhauled nodes (e.g., nodes B-eNodeB1 130 and B-eNodeB2 150) may be located at its respective S-GW such that traffic going to/from the UE may be routed via the IP address of the self-backhauled B-eNodeB.

Figure 6A:
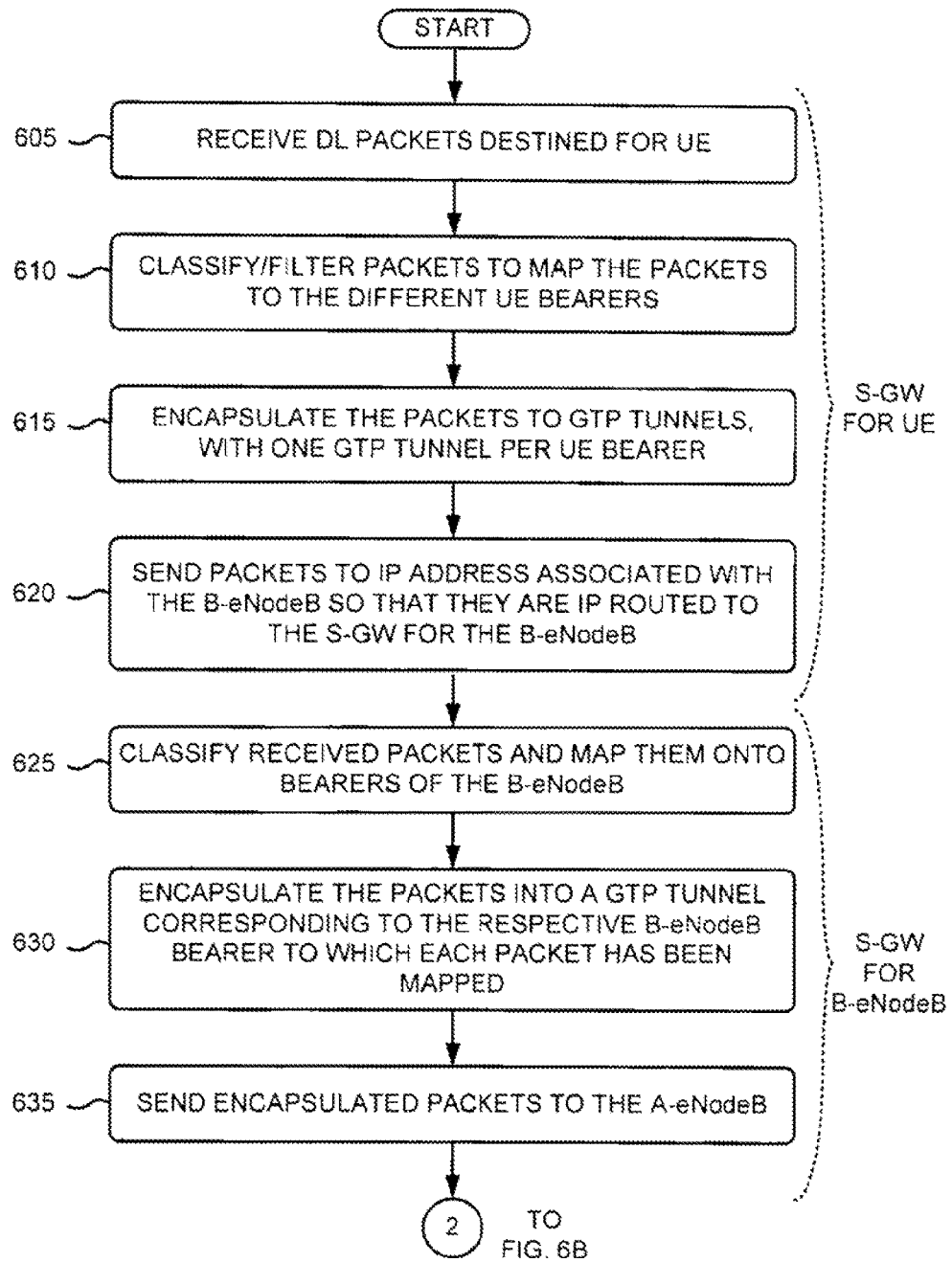
FIGS. 6A and 6B are flowcharts of an exemplary process associated with downlink packet processing and routing according to the exemplary embodiment of FIGS. 4 and 5.
Figure 6B:
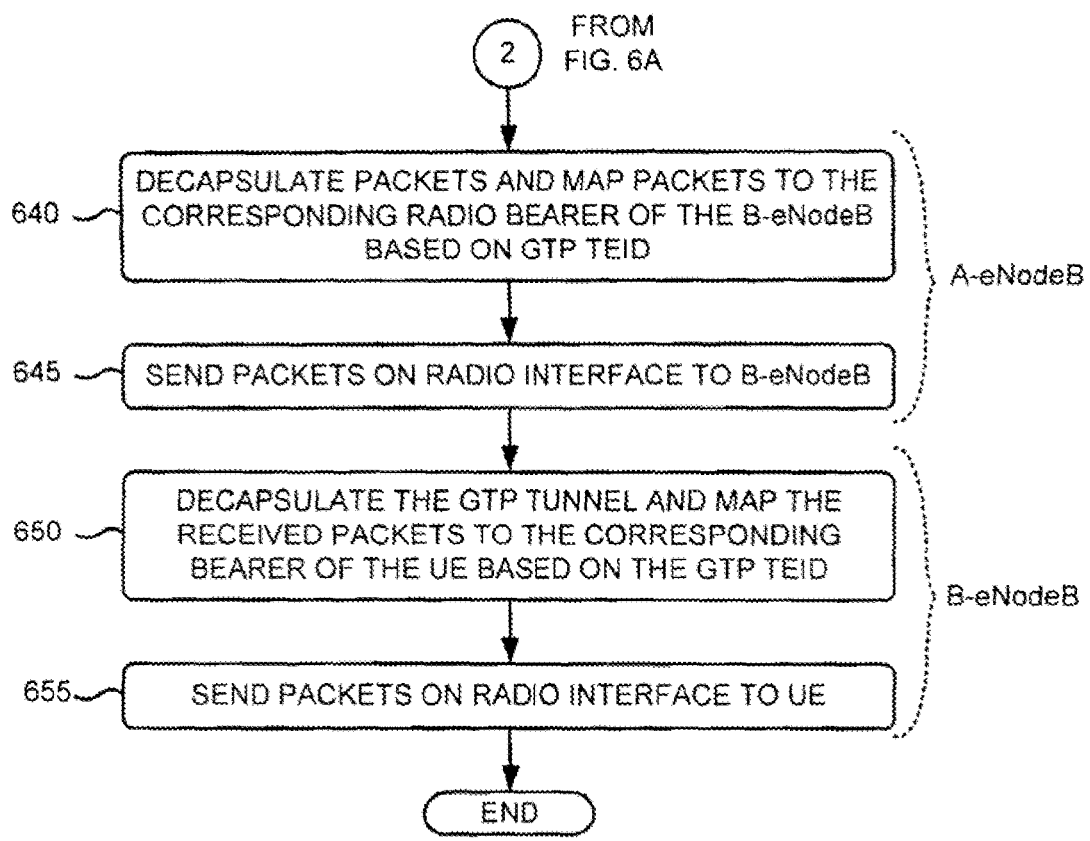

FIGS. 6A and 63 are flowcharts of an exemplary process associated with downlink packet processing and routing according to the exemplary embodiment of FIGS. 4 and 5 above in which the self-backhauled B-eNodeB may be allocated an IP address at its S-GW and packets from the S-GW of the UE find their way to a correct S-GW by regular IP routing. The following description of the exemplary process of FIGS. 6A and 6B is described with reference to the exemplify messaging diagram of FIG. 7 for purposes of illustration. Uplink packet processing may be conducted according to a reverse order of the downlink packet processing of FIGS. 6A and 6B.

Figure 7:
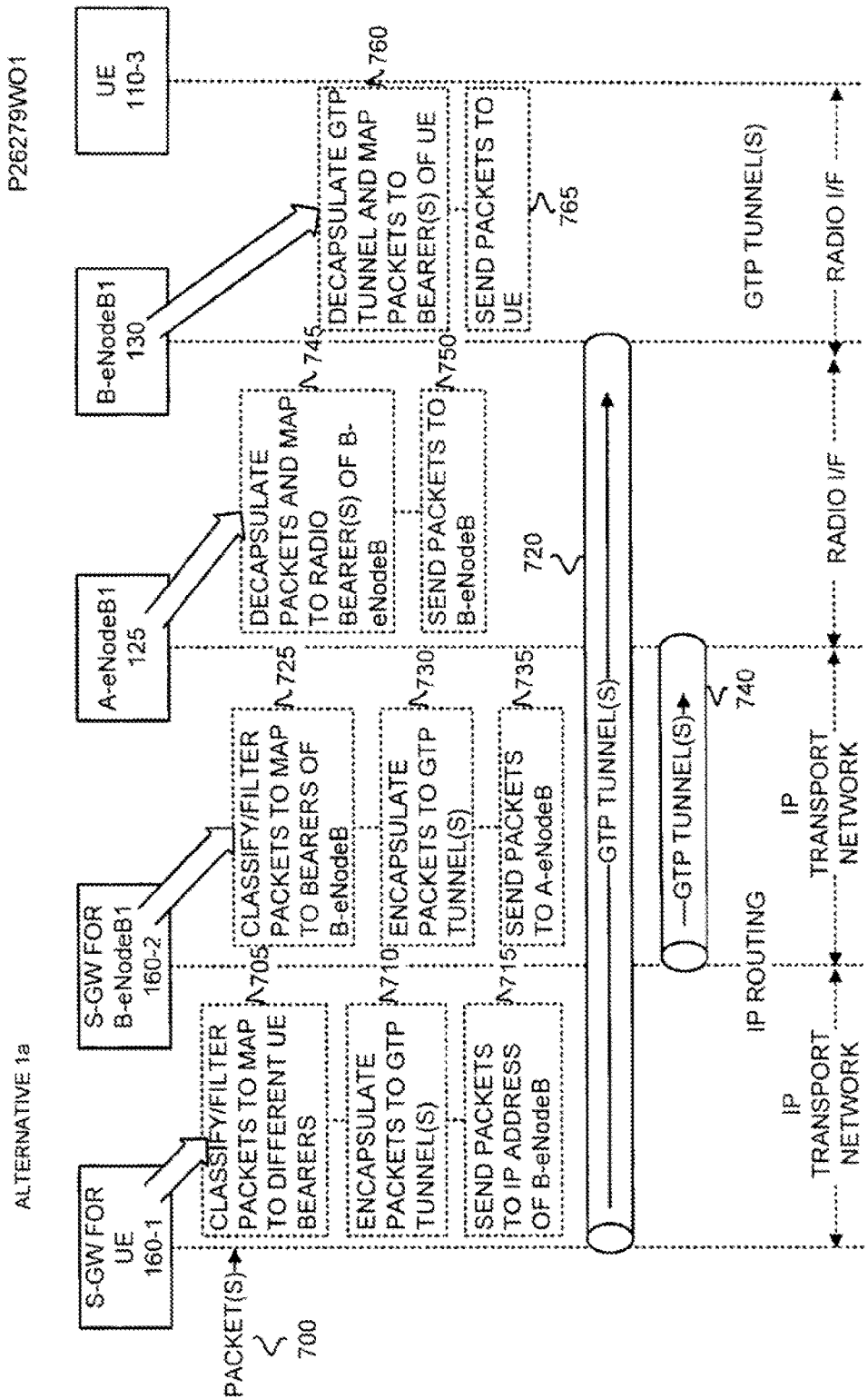
FIG. 7 is a messaging diagram associated with the exemplary process of FIGS. 6A and 6B.

The exemplary process may begin with the receipt of downlink packets destined for a given UE at the S-GW for that UE (block 605). For example, as shown in FIG. 7, S-GW 160-1 may receive downlink packets 700 that are destined for UE 110-3. The S-GW for the UE may classify/filter the received packets to map them to the different UE bearers (block 610). For example, FIG. 7 depicts S-GW 160-1 classifying/filtering 705 the received packets 700 to map the packets to different UE bearers. The packets may be encapsulated to GPRS Tunneling Protocol (GTP) tunnels, with one GTP tunnel per UE bearer (block 615). For example, FIG. 7 depicts S-GW 160-1 encapsulating 710 packets 700 to OFF tunnels. The packets may be sent to the IP address associated with the self-backhauled eNodeB (B-eNodeB) so that they are IP muted to the S-GW for the B-eNodeB (block 620). Since the IP address of the B-eNodeB is associated with a second S-GW, packets may automatically find their way to the second S-GW by regular IP routing. FIG. 7 depicts the packets being sent 715 to the IP address of the B-eNodeB such that they are IP routed to S-GW 160-2.

The S-GW for the B-eNodeB may classify received packets and map them into bearers of the B-eNodeB (block 625). Packet classification and napping at the S-GW for the B-eNodeB may include one or more of the following methods:
 a) The packets may be classified based on transport/network QoS indicators (set in the header of each IP packet by the S-GW serving the up. That is, the S-GW for the UE sets the QoS class (e.g., Diffserv codepoint) in the header of each IP packet based on the UE bearer QoS class. The S-GW for the B-eNodeB may map the packets onto the bearers of the B-eNodeB according to the Misery codepoint. The configuration of this mapping rule at the S-GW for the B-eNodeB may be static and may be established at system configuration and B-eNodeB set-up
 b) The packets may be classified at the S-GW for the B-eNodeB by looking into the inner GTP header (i.e., into the GTP Tunnel Endpoint Identifier (TEED) of the UE bearers, which would otherwise be visible only in the B-eNodeB) and classifying the packets accordingly. The classification rule (i.e., the rule specifying which inner GTP tunnel may be mapped to which B-eNodeB bearer may be configured at the S-GW for the B-eNodeB each time a new UE bearer is established, modified or released. The mapping rule can be configured by the MME when it establishes, modifies or releases a bearer for a particular LE.
In case the DiffServ codepoint cannot be used for packet classification (e.g., due to configuration limitations applied in the transport network), multiple IP addresses may be assigned to the B-eNodeB (e.g., one per backhaul bearer) and the IP addresses may be used to classify the packets.

The packets may be encapsulated into a GTP tunnel corresponding to the respective B-eNodeB bearer to which each packet has been mopped (block 630). For example, as shown in FIG. 7, S-GW 160-2 may classify/filter 725 the packets to map them to bearers of the B-eNodeB (e.g., B-enodeB1 130) and then may encapsulate 730 the packets to GTP tunnel(s). The S-GW far the B-eNodeB may send the encapsulated packets to the anchor eNodeB (A-eNodeB) (block 635). As further shown in FIG. 7, S-GW 160-2 may send 735 the packets to anchor node A-eNodeB1 125 via GTP tunnel(s) 740.

The A-eNodeB may decapsulate received packets and map the packets to the corresponding radio bearer of the B-eNodeB based on the GTP TEID (black 640). The A-eNodeB may send the packets on the radio interface to the B-eNode (block 645). For example, as depicted in FIG. 7, A-eNodeB1 125 may decapsulate 745 the packets and mop them to radio bearer(s) of B-eNodeB1 130 and then A-eNodeB1 125 may send 750 the packets to B-eNodeB1 130.

The B-eNodeB may decapsulate the GTP tunnel and map the received packets to the corresponding bearer of the UE based on the GTP TEID (block 650). The B-eNodeB may send the packets on the radio interface to the destination UE (block 655). For example, as depicted in FIG. 7, B-eNodeB1 130 may decapsulate 760 the GTP tunnel(s) and map the packets to a bearer(s) of the UE, and then B-eNodeB1 130 may send the packets to UE 110-3 via the radio interface.

Figure 8:
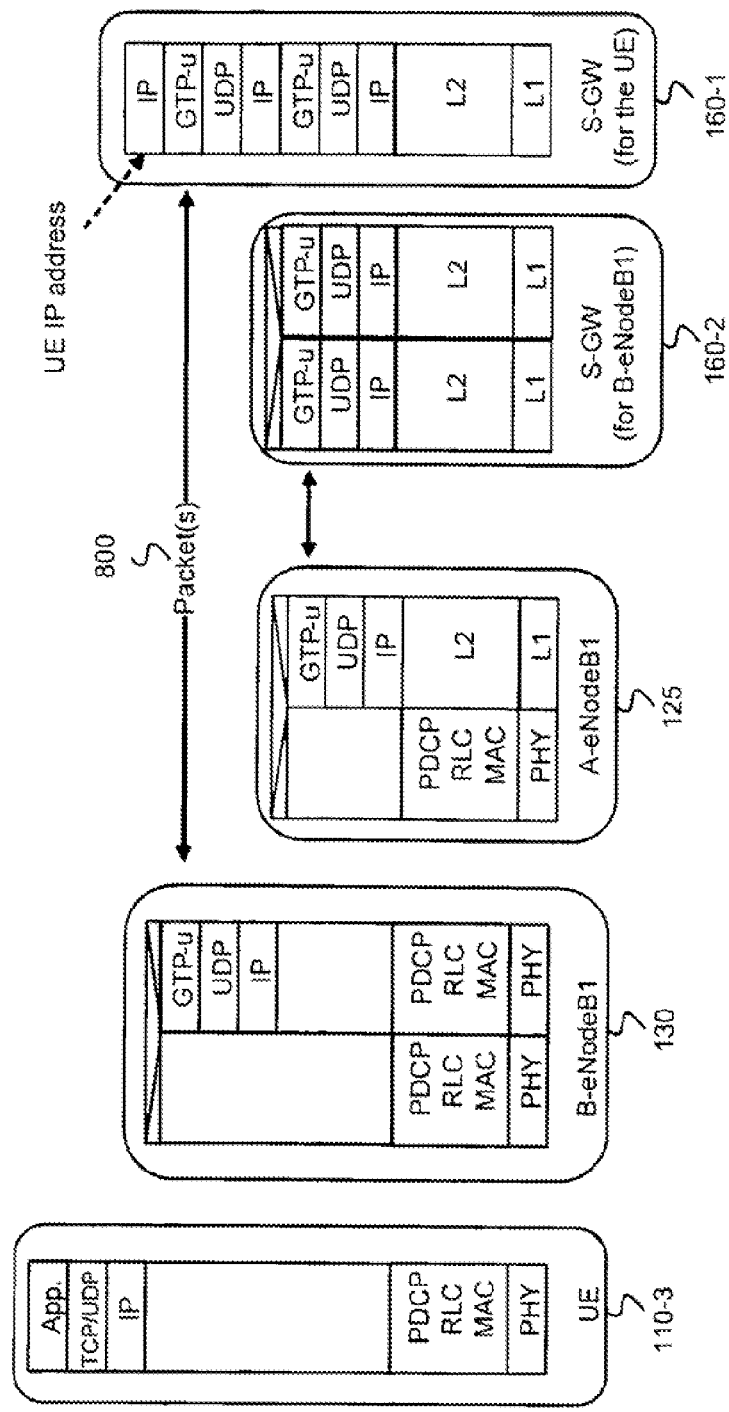
FIG. 8 depicts an S1 interface User Plane (S1-UP) protocol architecture associated with a second exemplary embodiment.
Figure 9:
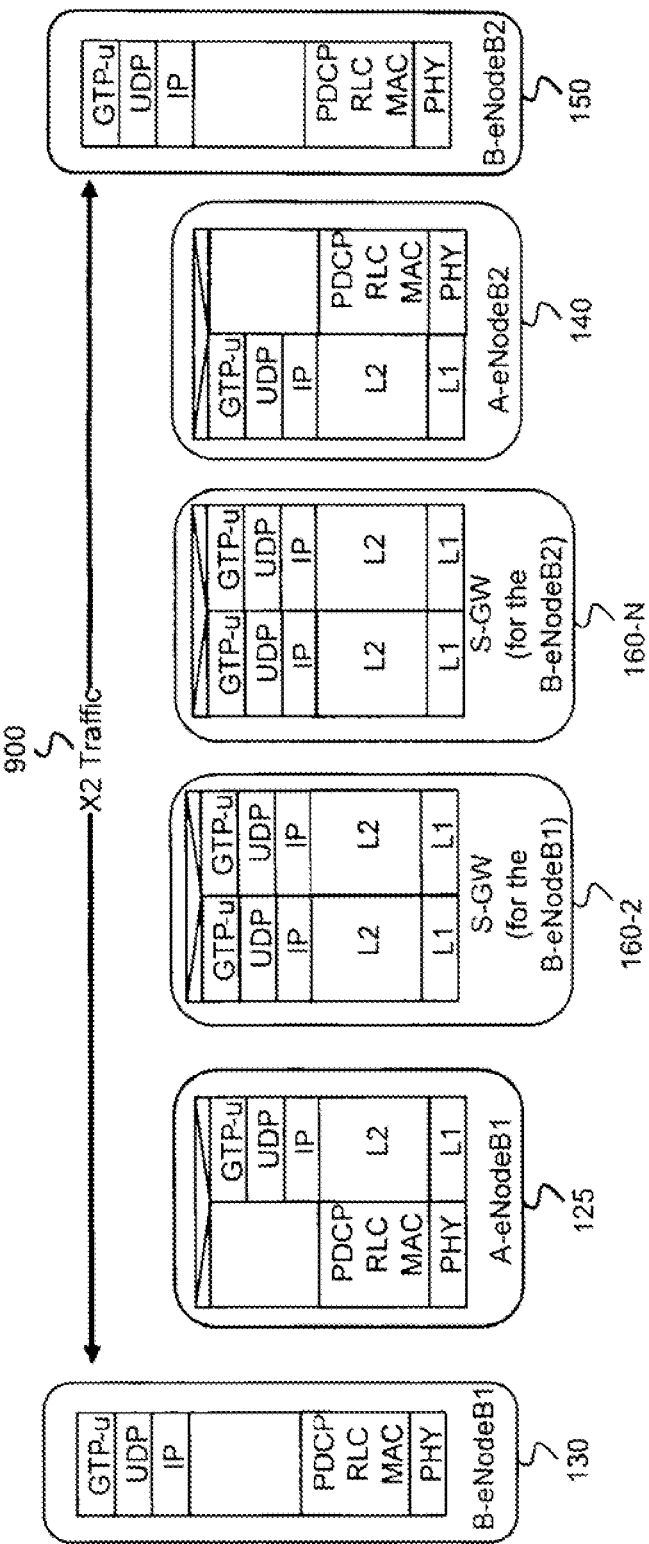
FIG. 9 further depicts an X2 interface UP (X2-UP) protocol architecture associated with the second exemplary embodiment.

FIGS. 8 and 9 depict the second exemplary embodiment in which routing between the S-GW fir the self-backhauled B-eNodeB and the S-GW for the UE may use GTP tunneling, in this exemplary embodiment, a GTP tunnel may be established between the two S-GW nodes corresponding to each bearer of the B-eNodeB. FIG. 8 depicts an S1 interface User Plane (S1-UP) protocol architecture associated with the second exemplary embodiment. As shown in FIG. 8, packets 800 may be tunneled between S-GW 160-1 and S-GW 160-2 and then between S-GW 160-2 and A-eNodeB1 125 for delivery to UE 110-3 via B-eNodeB 130.

FIG. 9 further depicts an X2 interface UP (X2-UP) protocol architecture associated with the second exemplary embodiment. As shown in FIG. 9, both B-eNodeBs (e.g., B-eNodeB1 130 and B-eNodeB2) involved in the handoff a UE (e.g., UE 110-3) from one self-backhauled B-eNodeB to another self-backhauled B-eNodeB, and at two ends of an X2 interface, ma have their own S-GW logical nodes. For example, as shown in FIG. 5, B-eNodeB1 130 may have its own S-GW 160-2 and B-eNodeB2 150 may have its own S-GW 160-N. X2 traffic 900 may be routed based on GTP tunneling between S-GW 160-N and S-GW 160-2 to reach either B-eNodeB1 130 or B-eNodeB2 150. In the exemplary embodiment depicted in FIG. 9, the X2 interface set-up procedure may establish GTP tunnels between the two S-GW nodes (e.g., S-GW 160-N and S-GW 160-2) during a self-backhauled B-eNodeB setup/configuration phase.

Figure 10A:
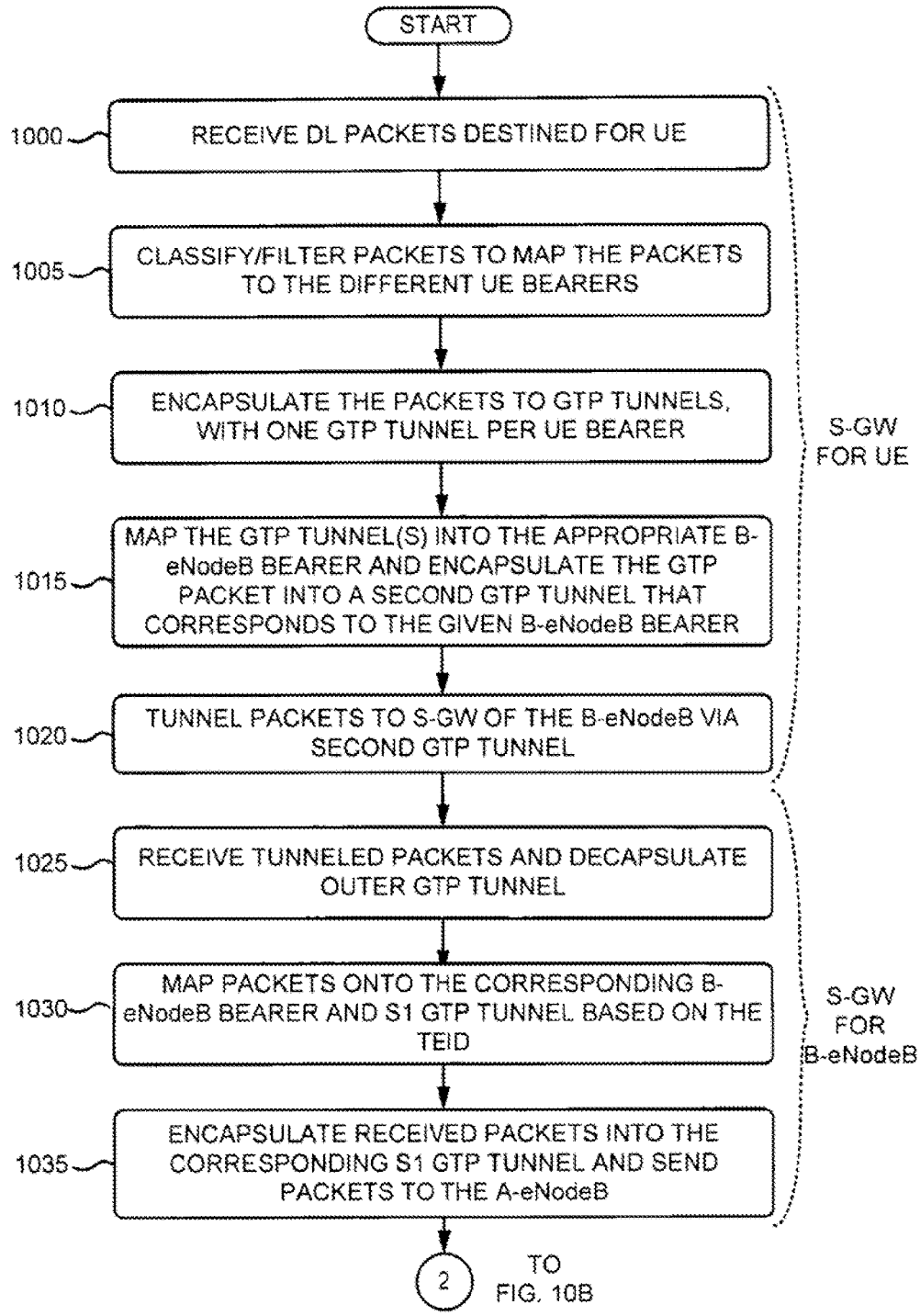
FIGS. 10A and 10B are flowcharts of an exemplary process associated with downlink packet processing and routing according to the exemplary embodiment of FIGS. 8 and 9.
Figure 10B:
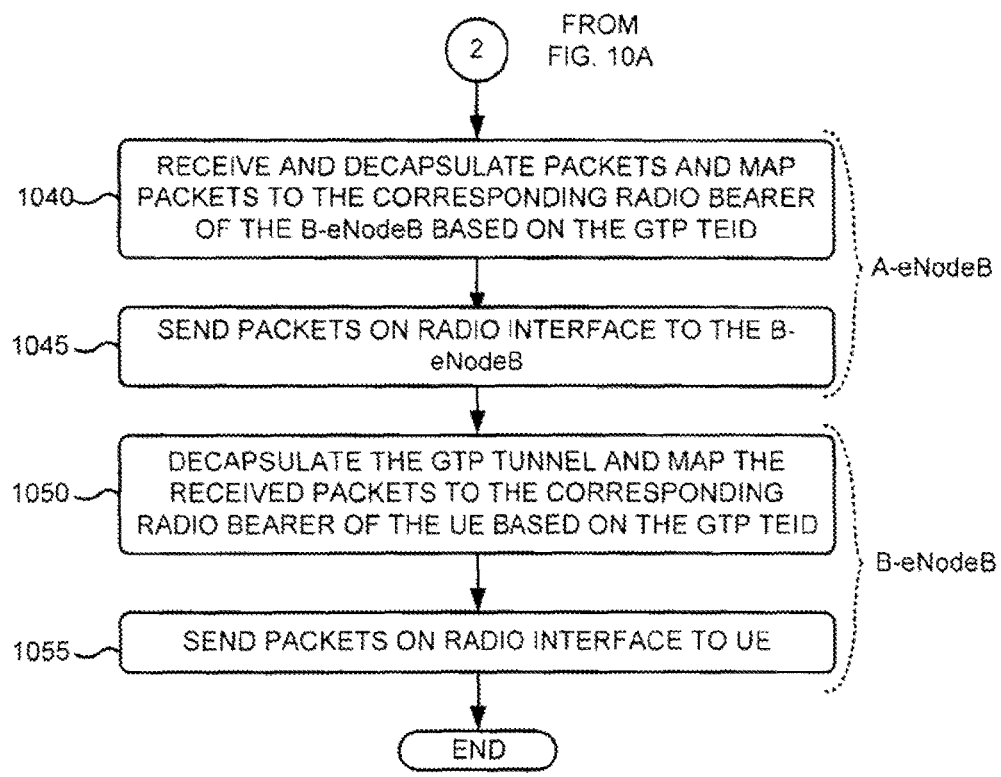

FIGS. 10A and 10B are flowcharts of an exemplary process associated with downlink packet processing and routing according to the exemplary embodiment of FIGS. 8 and 9 above in which routing between the S-GW for the self-backhauled B-eNodeB and the S-GW for the UE may use GTP tunneling. In the exemplary process of FIGS. 10A and 10B, a GTP tunnel may be established between the two S-GW nodes corresponding to each bearer of the B-eNodeB. The following description of the exemplary process of FIGS. 10A and 10B is described with reference to the exemplary messaging diagram of FIG. 11 for purposes of illustration. Uplink packet processing may be conducted according to a reverse order of the downlink packet processing of FIGS. 10A and 10B.

Figure 11:
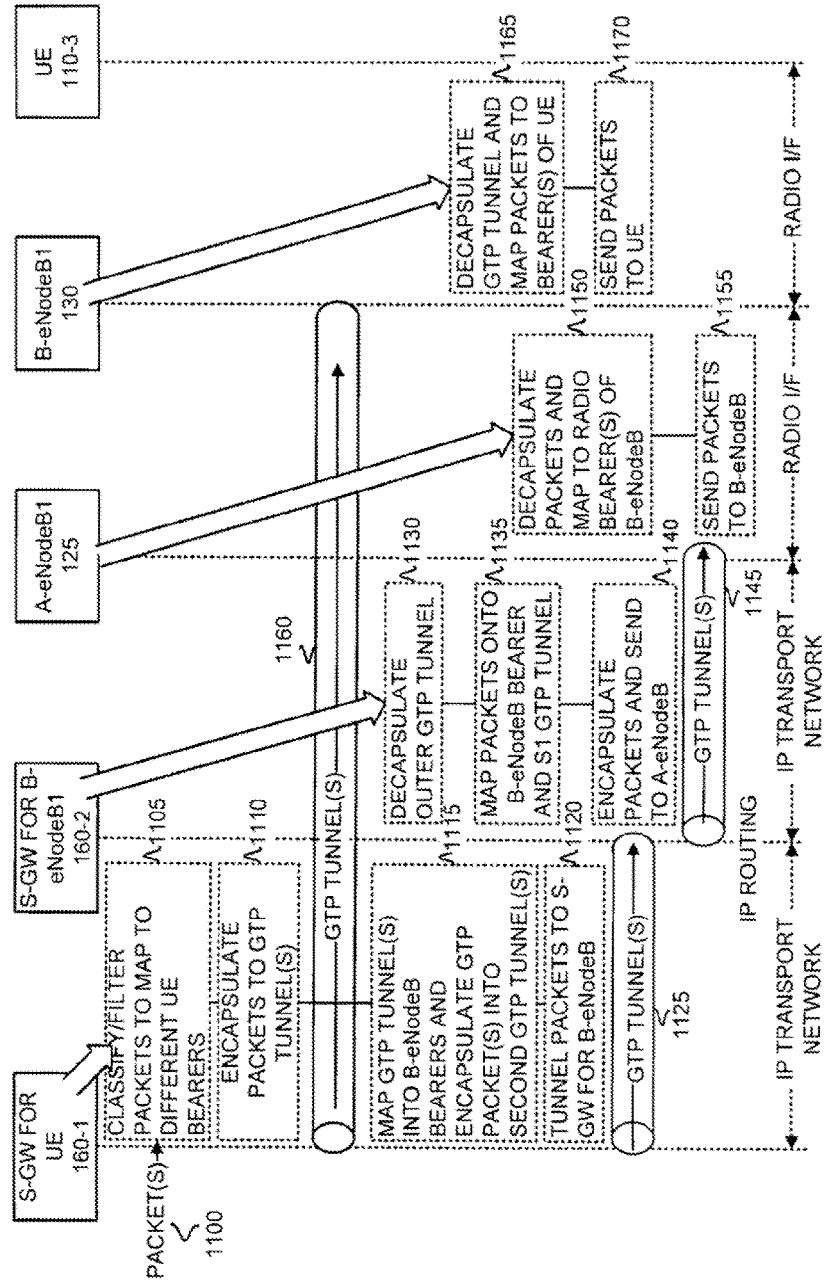
FIG. 11 is a messaging diagram associated with the exemplary process of FIGS. 10A and 10B.

The exemplary process may begin with the receipt of downlink packets, destined for a UE, at the S-GW for the UE (block 1000). For example, as shown in FIG. 11, packets 1100, destined for UE 110-3, are received at S-GW 160-1. The received packets may be classified/filtered to map the packets to the different UE bearers (block 1005). FIG. 11 depicts S-GW 160-1 classifying/filtering 1105 packets 1110 to map the packets to different UE bearers. The packets may be encapsulated to GTP tunnels, with one GTP tunnel per UE bearer (block 1010). As shown in FIG. 11, S-GW 160-1 may encapsulate packets 1100 to a GTP tunnel(s) 1160.

The GTP tunnel(s) may be mapped alto the appropriate B-eNodeB bearer and the GTP packet may be encapsulated into a second GTP tunnel that corresponds to the given B-eNodeB bearer (block 1015). The second GTP tunnel may tunnel the packet to the S-GW of the B-eNodeB. FIG. 11 depicts S-GW 160-1 mapping 1115 the GTP tunnel(s) into B-eNodeB bearers and encapsulating GTP packets into second GTP tunnel(s). The S-GW for the UE may tunnel the packets to the S-GW of the B-eNodeB via the second GTP tunnel (block 1020). FIG. 11 depicts S-GW 160-1 tunneling 1120 packets 1100 to the S-GW for the B-eNodeB1 (e.g., S-GW 160-2) via GTP tunnel(s) 1125.

The S-GW for the B-eNodeB may receive the tunneled packets and may decapsulate the outer GTP tunnel (block 1025). As shown in FIG. 11, S-GW 160-2 decapsulates 1130 the outer tunnel of the packets 1100 received via GTP tunnel(s) 1125.

The S-GW for the B-eNodeB may map the packets onto the corresponding B-eNodeB bearer and S1 GTP tunnel based on the TEID (block 1030). A one-to-one binding may exist between the GTP tunnel on the S-GW-S-GW interface and the GTP tunnel on the S1 interface. This binding may be created when the B-eNodeB bearer is established upon the set-up/configuration of the B-eNodeB. FIG. 11 depicts S-GW 160-2 mapping 1135 the packets onto the B-eNodeB bearer and the S1 GTP tunnel based on the TEID. The S-GW for the B-eNodeB may encapsulate the received packets into the corresponding S1 GTP tunnel and send the packets to the A-eNodeB (block 1035). The S1 GTP tunnel may be designated by the binding relation. FIG. 11 depicts S-GW 160-2 encapsulating 1140 the packets and sending the packets to A-eNodeB1 125 via GTP tunnel(s) 1145.

The A-eNodeB may receive and decapsulate the packets and map the packets to the corresponding radio bearer of the B-eNodeB based on the GTP TEID (block 1040). As shown in FIG. 11, A-eNodeB1 125 may decapsulate 1150 the packets received from S-GW 160-2 via GTP tunnel(s) 1145 and map the packets to a radio bearer(s) of the B-eNodeB1 (e.g., B-eNodeB1 130). The A-eNodeB may send packets on the radio interface to the B-eNodeB (block 1045). FIG. 11 depicts A-eNodeB1 125 sending 1155 the packets to B-eNodeB1 130.

The B-eNodeB may decapsulate the GTP tunnel and imp the received packets to the corresponding radio bearer of the UE based or the GTP TEID (block 1050). The B-eNodeB may then send the packets on the radio interface to the UE (block 1055). FIG. 11 depicts B-eNodeB1 130 decapsulating 1165 the GTP tunnel and mapping the packets to bearer(s) of UE 110-1, and sending 1170 the packets to UE 110-3 on the radio I/F.

Figure 12:
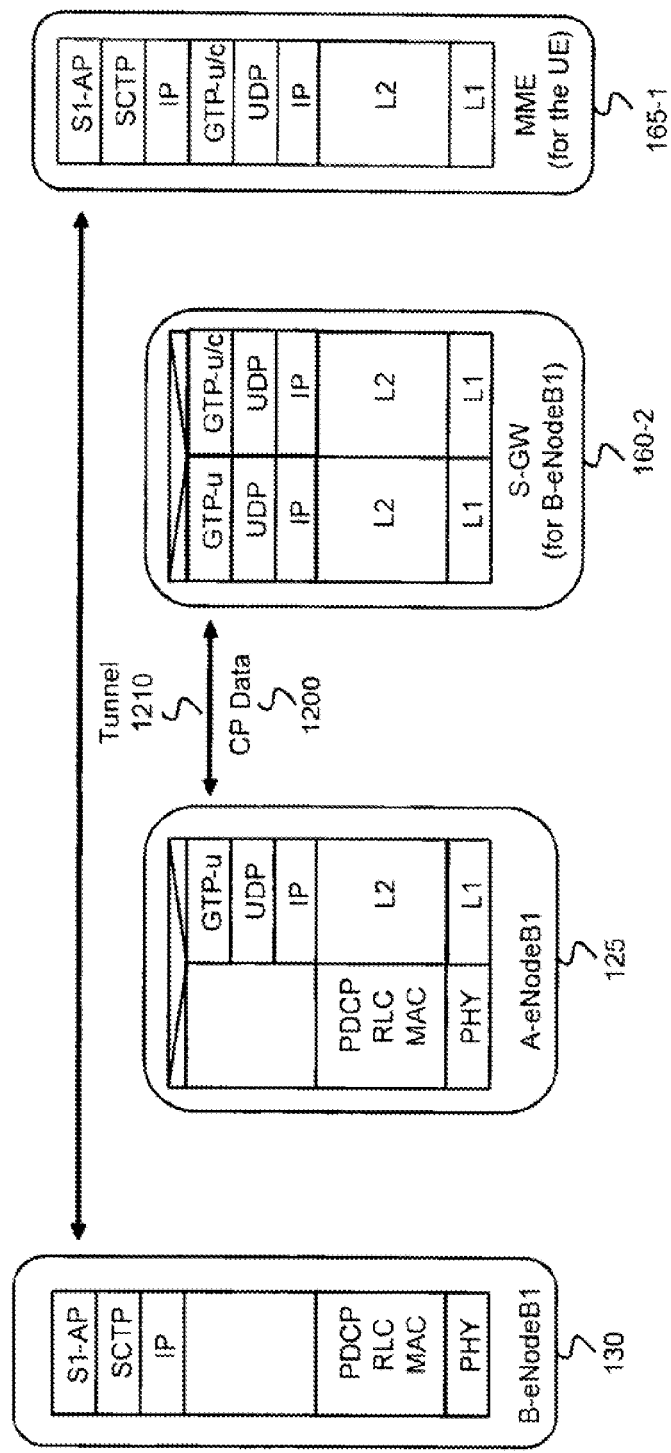
FIG. 12 illustrates an S1-Control Plane (CP) protocol architecture associated with the exemplary embodiments of FIGS. 4, 5, 8 and 9.

FIG. 12 illustrates an S1-Control Plane (CP) protocol architecture associated with the exemplary embodiments of FIGS. 4, 5, 8 and 9. Control plane traffic may be handled in as same way as if it were user traffic generated at the self-backhauled eNodeB, although it may be sent on a different bearer, CP data 1200 may be tunneled 1210 from the anchor eNodeB (e.g., A-eNodeB1 125) to the S-GW (e.g., S-GW 160-2) serving the self-backhauled eNodeB (e.g., B-eNodeB1 130). An additional mechanism may be used to route the data between the MME (e.g., MME 165-1) serving the UE and the S-GW (e.g., S-GW 160-2) serving the self-backhauled eNodeB. Two exemplary mechanisms may be employed to route the data between the MME and the S-GW: 1) IP routing of the data based on the self-backhauled eNodeB IP address which may be allocated at the S-GW serving the self-backhauled eNodeB; or 2) muting the data via GTP tunneling.

In the case of GTP tunneling of data between MME 165-1 and S-GW 160-2, either the user plane part or the control plane part of GTP may be used to transfer control plane data. If GTP-c is used, then GTP-c protocol may be extended to include the capability of transparent transfer of signaling messages. The GTP association (either user plane or control plane) between S-GW 160-2 and MME 165-1 may be established at the time when the S1 connection is established between B-eNodeB1 130 and MME. 165-1 (i.e., at the set-up of B-eNodeB1 130).

Figure 13:
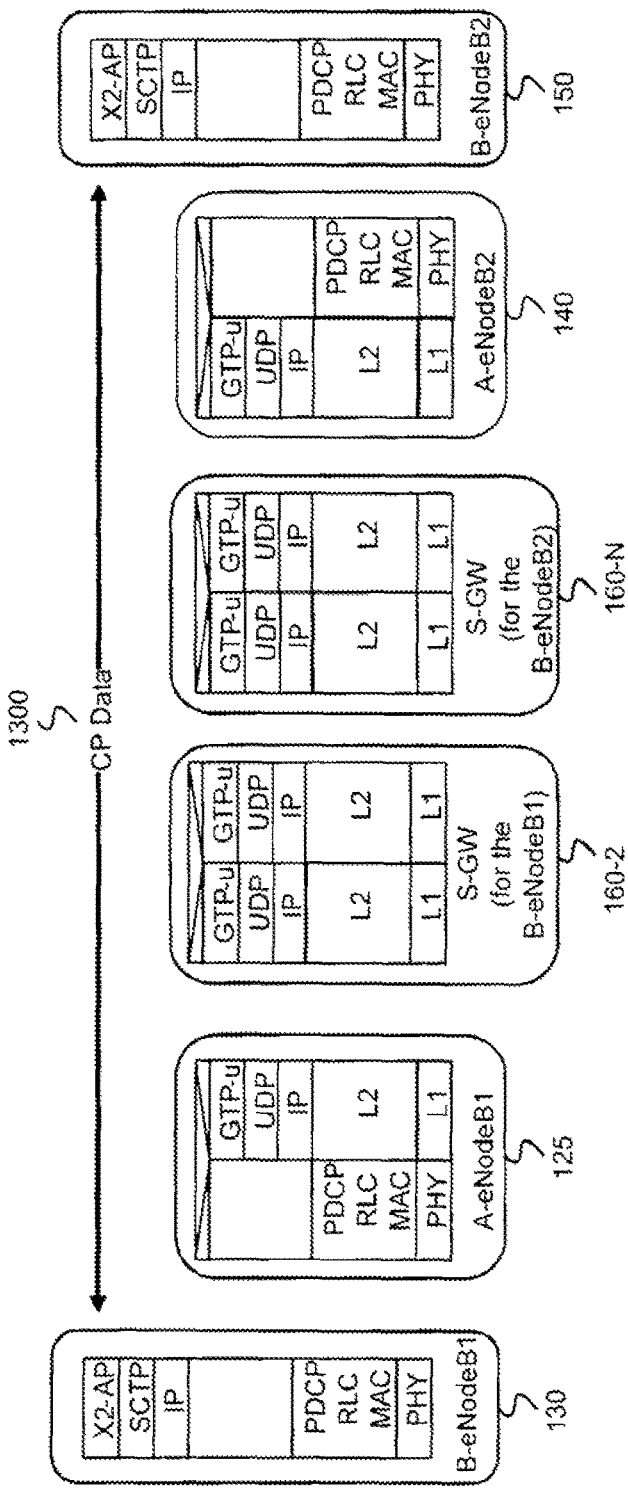
FIG. 13 illustrates a CP protocol architecture on an X2 interface for the exemplary embodiments of FIGS. 4, 5, 8 and 9.

FIG. 13 further depicts the CT protocol architecture on the X2 interface for the exemplary embodiments of FIGS. 4, 5, 8 and 9. Tunneling may be used in the control plane similar to the X2 interface. For example, control plane data 1300 may be tunneled from the anchor eNodeB (e.g., A-eNodeB 125), that is serving the self-backhauled eNodeB (e.g., B-eNodeB1 130), to the corresponding S-GW and then routed via the S-GW serving the self-backhauled eNodeB down to the corresponding anchor eNodeB. Packets may be carried between the two S-GWs either via IP routing or via GTP tunneling (shown in FIG. 13). If GTP tunneling is used between the two S-GWs, then the GTP tunnel, corresponding to the neighboring B-eNodeB1 130 and B-eNodeB2 150, may be established at the time of establishing the X2 interface (i.e., at B-eNodeB set-up/configuration). To carry the control plane messages (either D1 or X2) from/to the B-eNodeB, a separate bearer(s) may be established for the self-backhauled eNodeB (separate from bearers for user plane traffic) which may receive different Quality of Service (QoS) treatments higher priority) than user data going to/from a UE served by the self-backhauled eNodeB.

Figure 14:
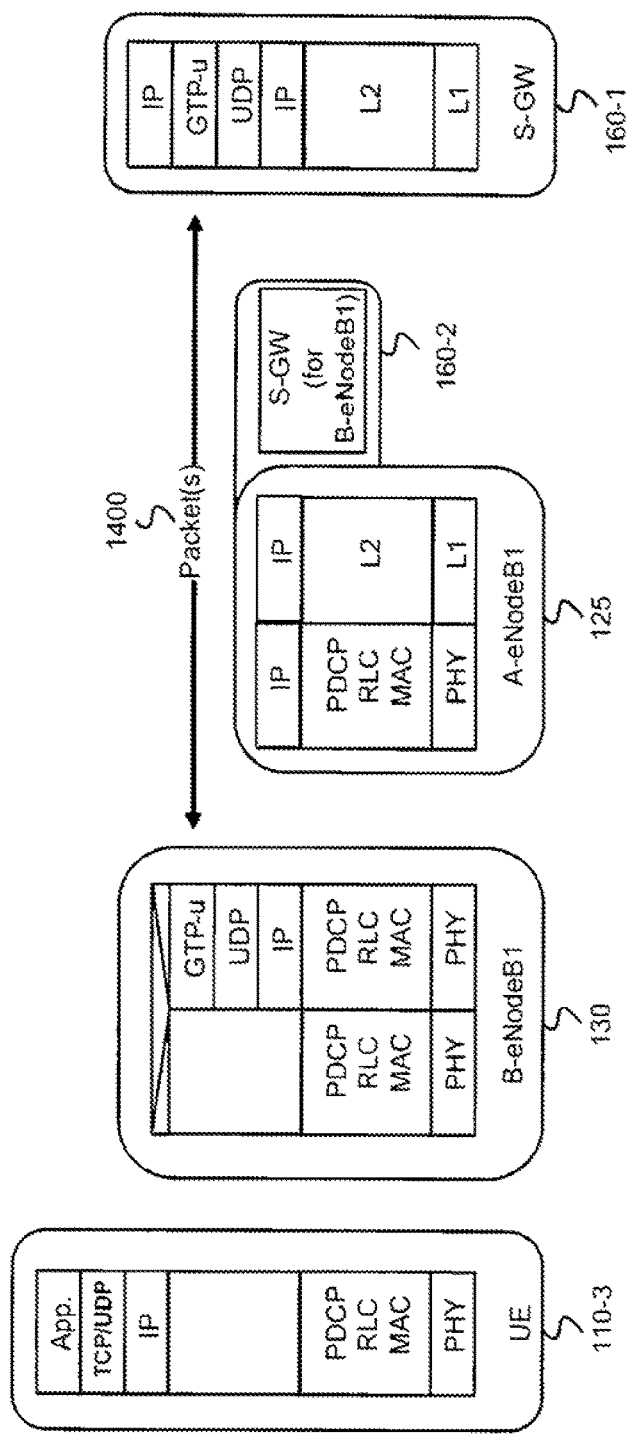
FIG. 14 illustrates an S1-CP protocol architecture associated with a second exemplary embodiment.
Figure 15:
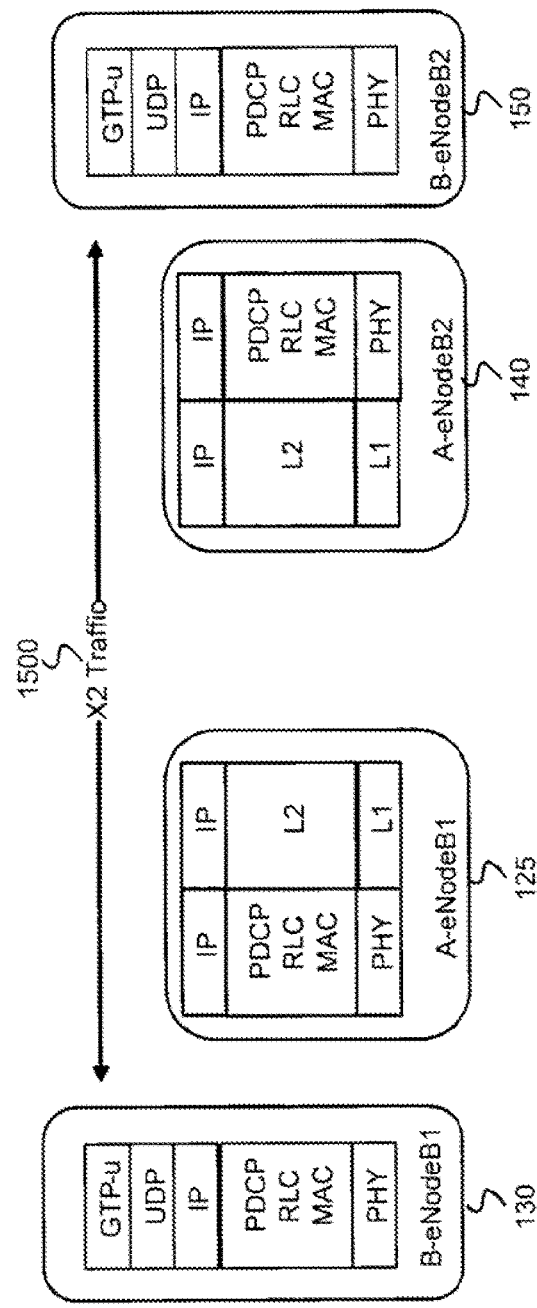
FIG. 15 illustrates an X2-UP protocol architecture associated with the second exemplary embodiment, of FIG. 14.

As described herein, a network routing approach may alternatively be employed for sending packets to UEs via a self-backhauled B-eNodeB. In one realization of this approach, the anchor eNodeB may be seen as part of the transport network, acting like an IP muter in between the self-backhauled eNodeB and the core network. The user plane architecture for this realization is shown in FIGS. 14 and 15 for the S1 and X2 interfaces, respectively. On both interfaces, packets 1400 addressed to the self-backhauled eNodeB are routed via the anchor eNodeB based on the self-backhauled eNodeB's IP address. The anchor eNodeB (e.g., A-eNodeB1 125) may have S-GW functionality S-GW 160-2) included and may act as the S-GW for the self-backhauled eNodeB (e.g., B-eNodeB1 130). Full-fledged S-GW functionality may not be needed, since many complex functions (e.g., mobility handling, etc.) may be omitted. The IP address of B-eNodeB1 130 may be allocated at A-eNodeB1 125, that acts as the S-GW, thus, collapsing S-GW and eNodeB functions into one node for the B-eNodeB bearers. The IP address allocated for the self-backhauled eNode may be an internal IP address in the operator's network and not reachable/routable to/from outside networks as opposed to the IP address of a regular UE. Existing control procedures from the MME towards the S-GW may be re used to execute bearer management at the self-backhauled eNodeB (i.e., less impact on the core network). For example, the MME can use existing signaling procedures to establish radio bearers for the self-backhauled eNodeB and configure corresponding packet filtering/classification rules as used to establish bearers for normal UEs.

In another realization of the network routing approach, the anchor eNodeB may be seen as an IP transport network node. Thus, the MME may handle the self-backhauled eNodeB (e.g., B-eNodeB1 130 slightly differently than a normal UE. This may include, for example, a somewhat modified mechanism for QoS management, i.e., the MME signaling for setting up radio bearers at the anchor eNodeB for the self-backhauled eNodeB.

Figure 16:
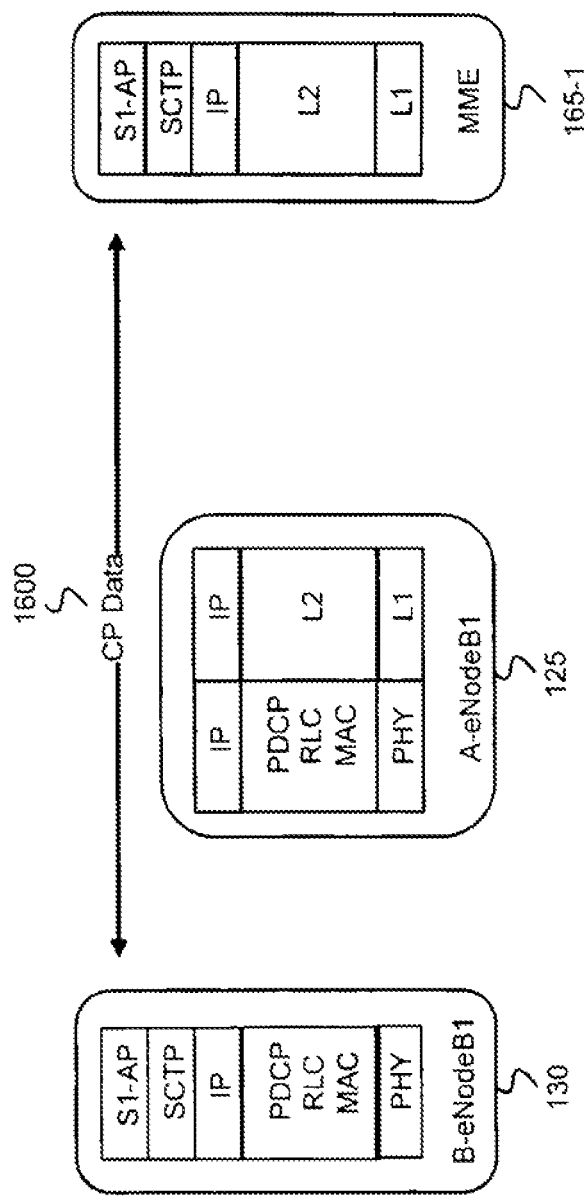
FIG. 16 illustrates an S1-CP protocol architecture associated with the second exemplary embodiment of FIGS. 14 and 15.
Figure 17:
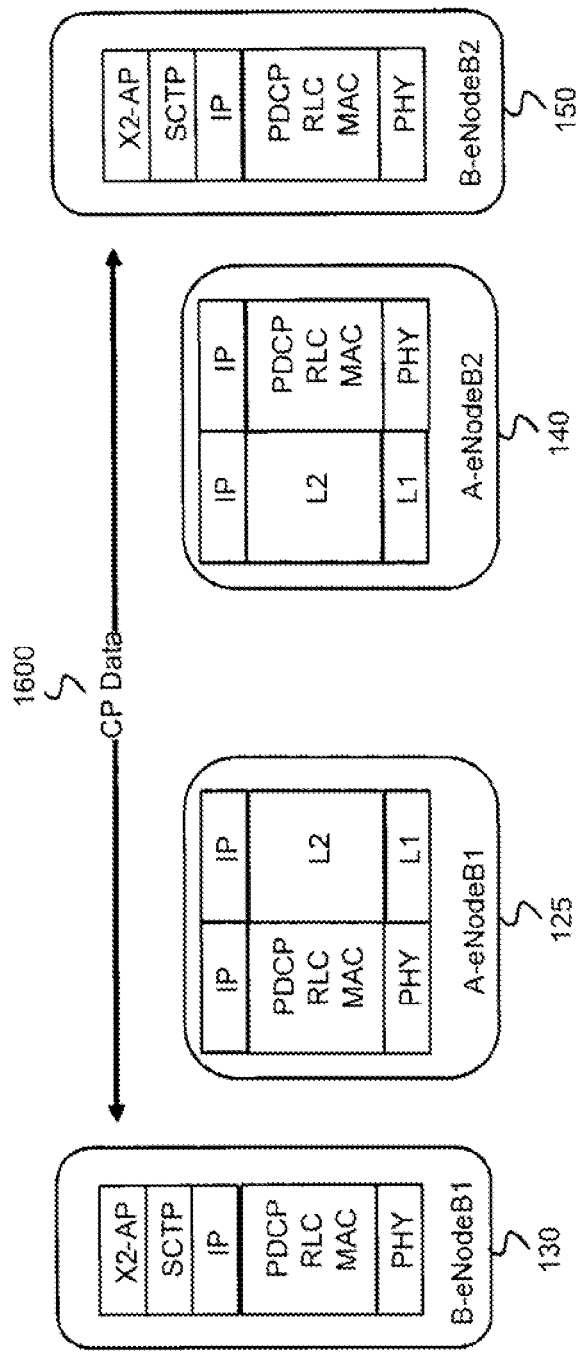
FIG. 17 illustrates an X2-CP protocol architecture associated with the second exemplary embodiment of FIGS. 14, 15 and 16.

FIG. 16 illustrates an S1-Control Plane (CP) protocol architecture associated with the exemplary embodiments of FIGS. 14 and 15. FIG. 17 further illustrates an X2-CP protocol architecture associated with the exemplary embodiments of FIGS. 14 and 15. IP packets carrying control plane data 1600 may be routed via the anchor eNodeB (e.g., A-eNodeB1 125) that acts like an IP router in the transport network. Packet processing for the CP can be similar as for the UP, the CP traffic preferably may be mapped to different bearers with different QoS characteristics as compared to user data. The MME acting as the serving MME for the self-backhauled eNodeB may have to configure the radio bearers and set the packet classification rules in the anchor eNodeB such that the control plane traffic nay be mapped on high priority bearers. This configuration may be performed when the S1 and X2 interface is established (i.e., at B-eNodeB set-up/configuration).

Figure 18:
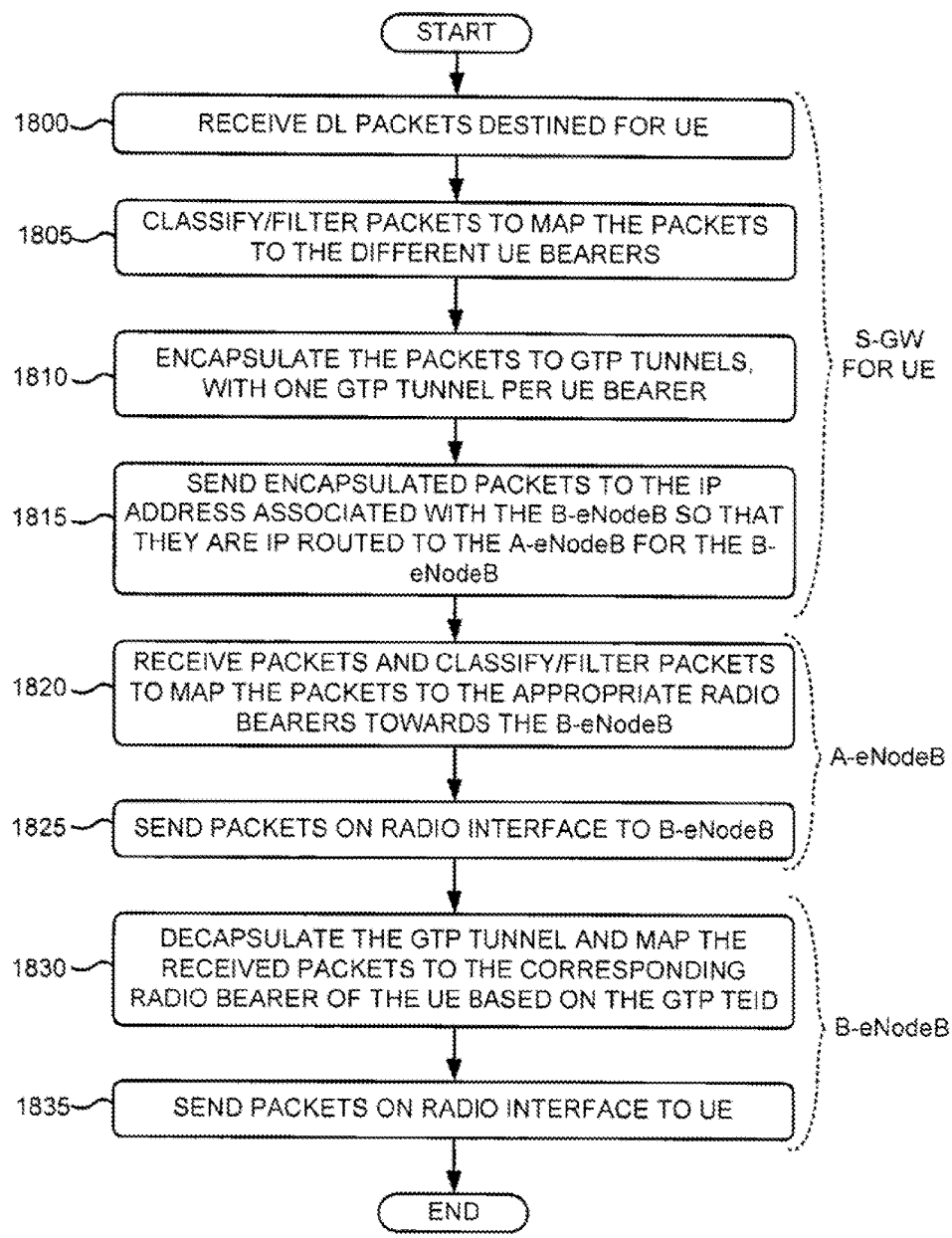
FIG. 18 is a flowchart of an exemplary process associated with downlink packet processing and routing according to the exemplary embodiment of FIGS. 14-17.

FIG. 18 is a flowchart of an exemplary process associated with downlink packet processing and routing according to the exemplary embodiment of FIGS. 14-17 in which a network routing approach, where the anchor eNodeB acts like an IP router for routing traffic between the self-backhauled eNodeB and the transport network. The following description of the exemplary process of FIG. 18 is described with reference to the exemplary messaging diagram of FIG. 19 for purposes of illustration. Uplink packet processing may be conducted according to a reverse order of the downlink packet processing of FIG. 18.

Figure 19:
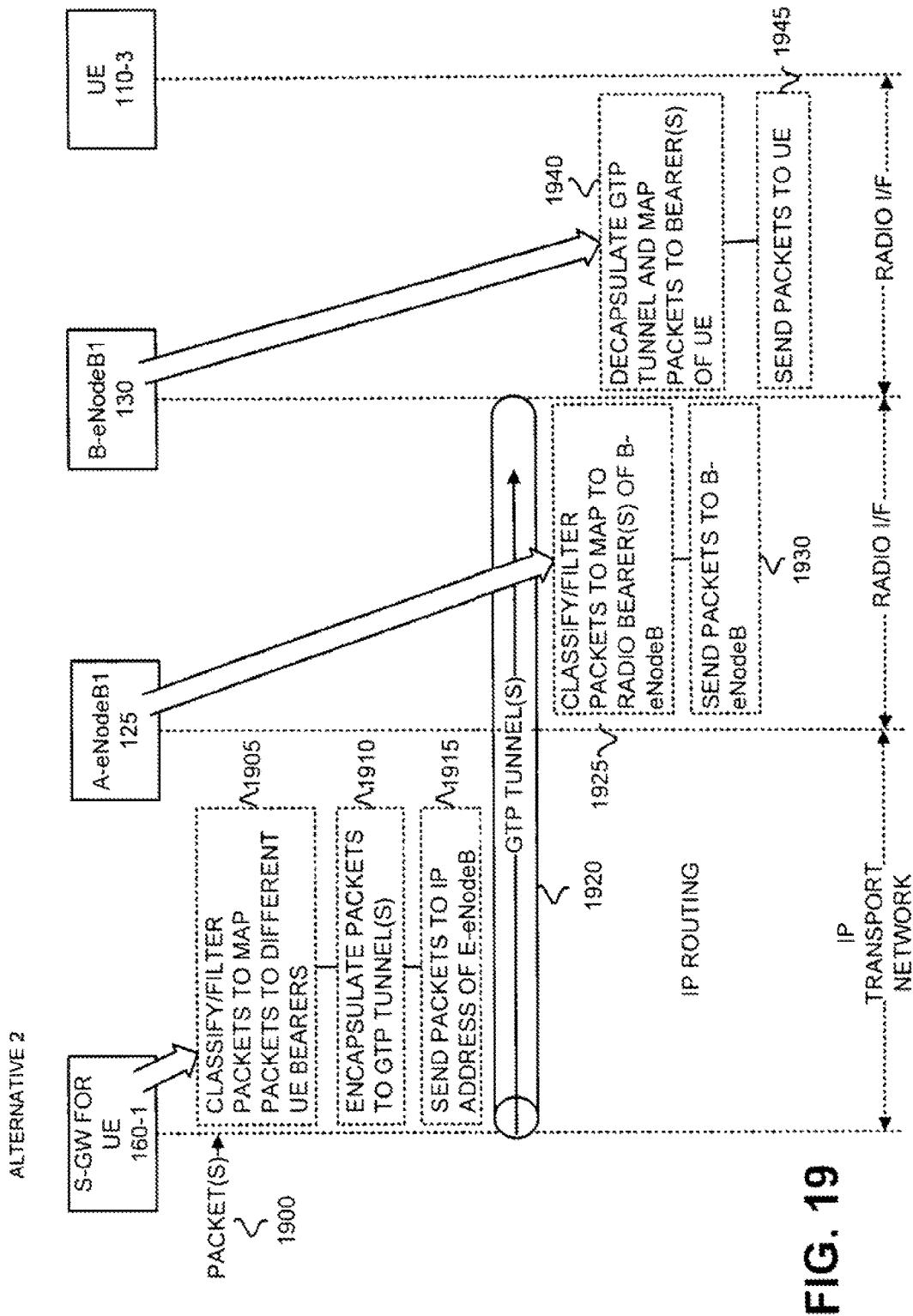
FIG. 19 is a messaging diagram associated with the exemplary process of FIG. 18.

The exemplary process may begin with the receipt of downlink packets destined for a UE at the S-GW for the UE (block 1800). For example, as shown in FIG. 19, packets 1900, which are destined for UE 110-3, may be received at S-GW 160-1. The S-GW for the UE may classify/filter packets to map the packets to the different UE bearers (block 1805). The techniques described above may be used fir packet classification at the S-GW for the UE. For example, packet classification may be based on transport network QoS indicators in the packet (e.g., based on IP packet Diffserv codepoints), based on the UE bearers by looking into the inner GTP header, or based on the IP address (i.e., if different IP addresses of the B-eNodeB exist for the different backhaul bearers). FIG. 19 depicts S-GW 160-1 classifying/filtering 1905 the received packets 1900 to map them to different UE bearers. The S-GW for the UE may encapsulate the packets to GTP tunnels, with one GTP tunnel per UE bearer (block 1810). FIG. 19 depicts S-GW 160-1 encapsulating 1910 the received packets 1900 to GTP tunnels. The S-GW for the UE may send the encapsulated packets to the Internet Protocol (IP) address associated with the B-eNodeB, that serves the destination UE, so that they are routed to the A-eNodeB for the B-eNodeB (block 1815). FIG. 19 depicts S-GW 160-1 sending 1915 the encapsulated packets to the IP address of the B-eNodeB (e.g., B-eNodeB1 130) serving UE 110-3 via GTP tunnel(s) 1920.

The A-eNodeB may receive the packets and classify/filter the packets to map the packets to the appropriate radio bearers towards the B-eNodeB (block 1820). The packets sent from the S-GW for the UE may arrive at the correct A-eNodeB via IP routing. FIG. 19 depicts A-eNodeB1 125 classifying/filtering 1925 the packets and mapping them to radio bearer(s) of B-eNodeB1 130. The A-eNodeB may send the packets on the radio interface to the B-eNodeB (block 1825). FIG. 19 depicts A-eNodeB1 125 sending 1930 the packets to B-eNodeB1 130 on the radio I/F.

The B-eNodeB may decapsulate the GTP tunnel and imp the received packets to the corresponding radio bearer of the UE based on the GTP TEID (block 1830). FIG. 19 depicts B-eNodeB1 130 decapsulating 1940 GTP hawks) 1935 and nipping the packets to beater(s) of UE 110-3. The B-eNodeB may send the packets on the radio interface to the UE (block 1835). FIG. 19 depicts B-eNodeB1 130 sending 1945 the packets to UE 110-3 via GTP tunnel(s) 1950.

A further evolution of the exemplary embodiment depicted in FIGS. 14-17 involves the introduction of a proxy functionality in the anchor eNodeB such that the A-eNodeB acts as a proxy between the core network serving the UE and the self-backhauled eNodeB and the proxy function of the A-eNodeB effectively hides the B-eNodeB from the core network nodes. In other words, the A-eNodeB appears as one large eNodeB that can support tinny UEs from the core network point of view.

More specifically, the A-eNodeB appears toward the S-GW serving the UE and also toward the MME of the UE as if the UE would be connected to the A-eNodeB directly. Therefore, when the S-GW of the UE sends user data toward the UE, the S-GW sends the packets to the A-eNodeB via a GTP based tunneling mechanism. Then it is the responsibility of the A-eNodeB to further transmit the UE packets to the B-eNodeB which, in turn, delivers the data to the UE. For this purpose, a tunnel mapping function may be needed in the A-eNodeB which imps the downlink GTP tunnel from the S-GW to a GTP tunnel toward the A-eNodeB. The A-eNodeB builds such a mapping table of GTP tunnels at the time when the UE data bearers are established.

Likewise, in control signaling, the MME of the UE "talks" only to the A-eNodeB, such as, for example, when the MME requests the setup of a bearer for the UE. The A-eNodeB translates this request toward the B-eNodeB, which mates the requested UE bearer. This bearer set-up may remain hidden from the standpoint of the MME. From the B-eNodeB toward the core network direction, the proxy operation may not be totally transparent for the B-eNodeB. For this purpose, a message translation function may be needed in the A-eNodeB which ensure that the bypassed control messages are modified such that the node on one side of the A-eNodeB remains hidden for the node on the other side of the A-eNodeB. In order to achieve this, the A-eNodeB may need to modify at least the UE connection identifiers in the message such that the proper identifier that is valid on the given interface is used. This necessitates a mapping table of UE connection identifiers in the A-eNodeB. Other parts of the signaling messages, such as the information elements intended solely for the other end node (i.e., for the B-eNodeB or the MME) may not be modified by the A-eNodeB but may be copied transparently from one interface to the other.

Figure 20:
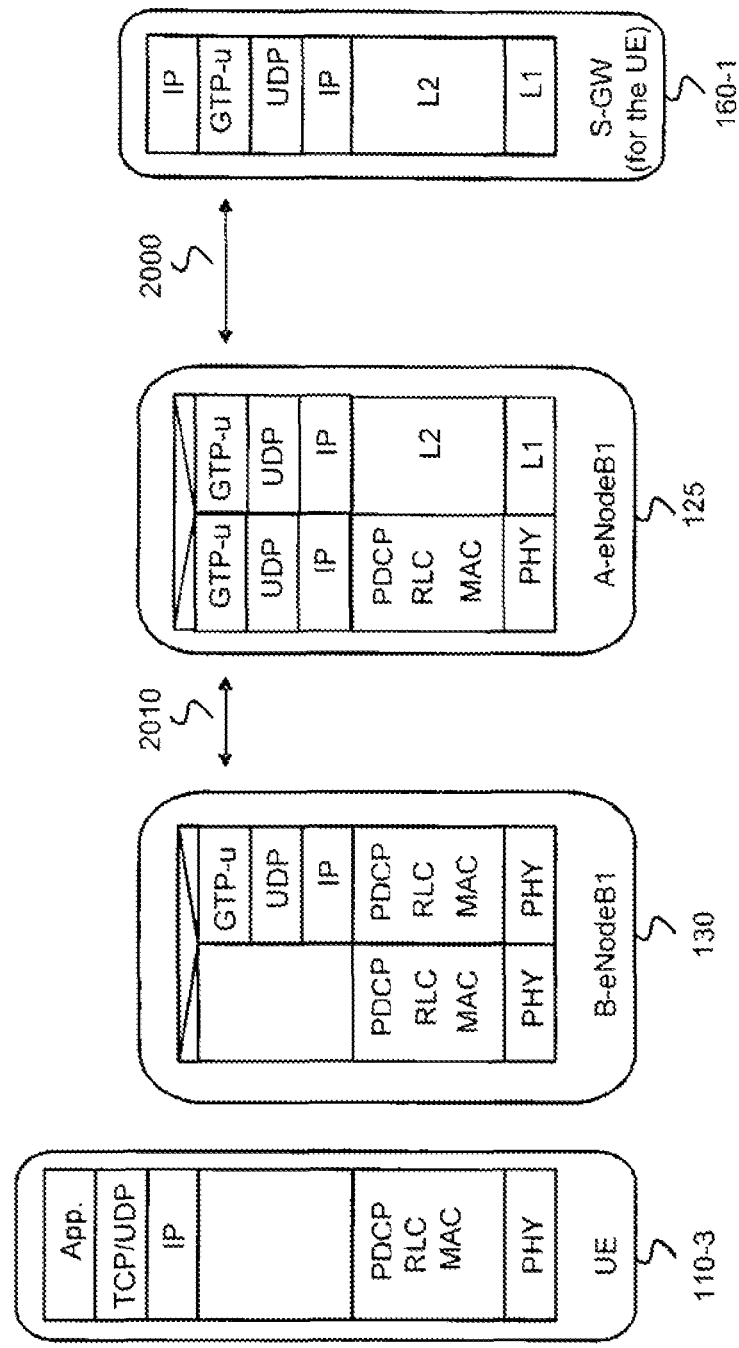
FIG. 20 illustrates an S1-UP protocol architecture associated with a third exemplary embodiment.
Figure 21:
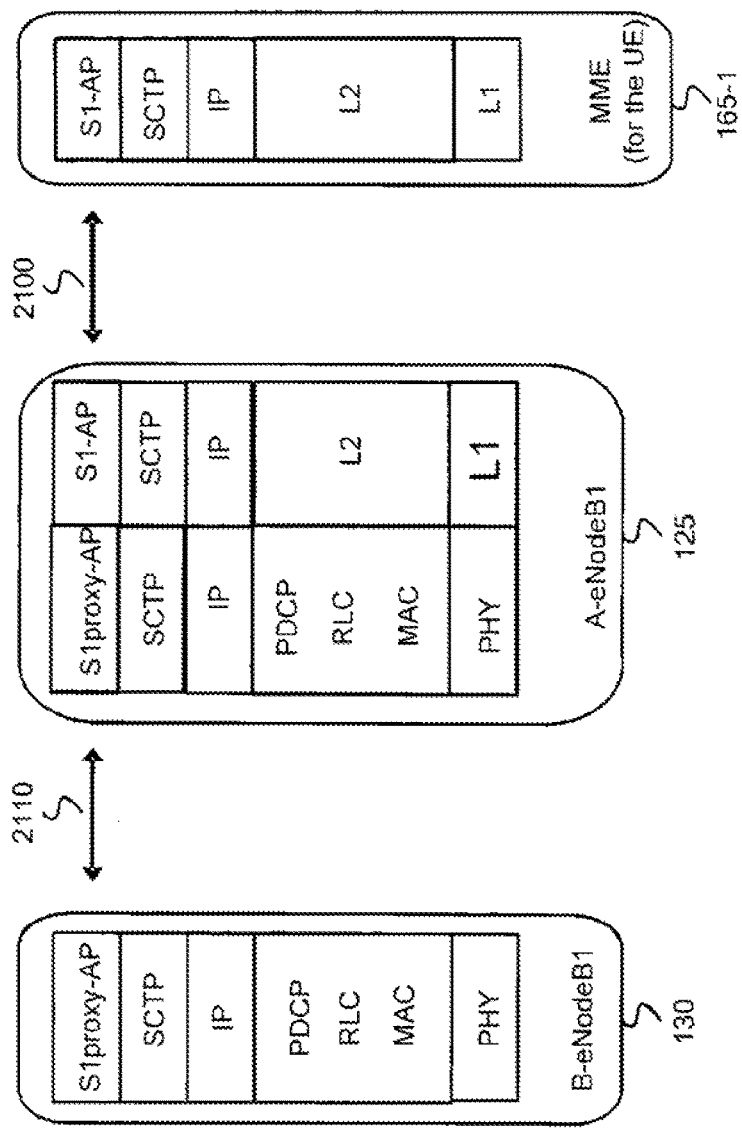
FIG. 21 illustrates an S1-CP protocol architecture associated with the third exemplify embodiment of FIG. 20.

An advantage of this proxy based solution is that self-backhauled eNodeBs can be completely hidden from the core network and the core network nodes may remain completely unchanged when introducing self-backhauling in the system. Only the A-eNodeB and B-eNodeB may need new functionality, especially if the MME functionality of the B-eNodeB is also integrated into the A-eNodeB. The protocol architectures for the user plane and the control plane associated with the proxy based embodiment are illustrated in FIGS. 20 and 21. FIG. 20 depicts two tunnels in the user plane, a first tunnel 2000 between S-GW 160-1 (e.g., the S-GW for the UE) and A-eNodeB1 125 and a second tunnel 2010 between A-eNodeB1 125 and B-eNodeB1 130. In the control plane, depicted in FIG. 21, the S1-CP protocol connection 2100 towards MME 165-1 may be terminated at A-eNodeB1 125 and there may be as second S1-CP protocol connection 2110 from A-eNodeB1 125 and B-eNodeB1. The proxy operation, described above, may also be applied for the X2 interface, in which case A-eNodeB1 125 can include not only an S1 proxy function but an X2 proxy function as well.

Figure 22A:
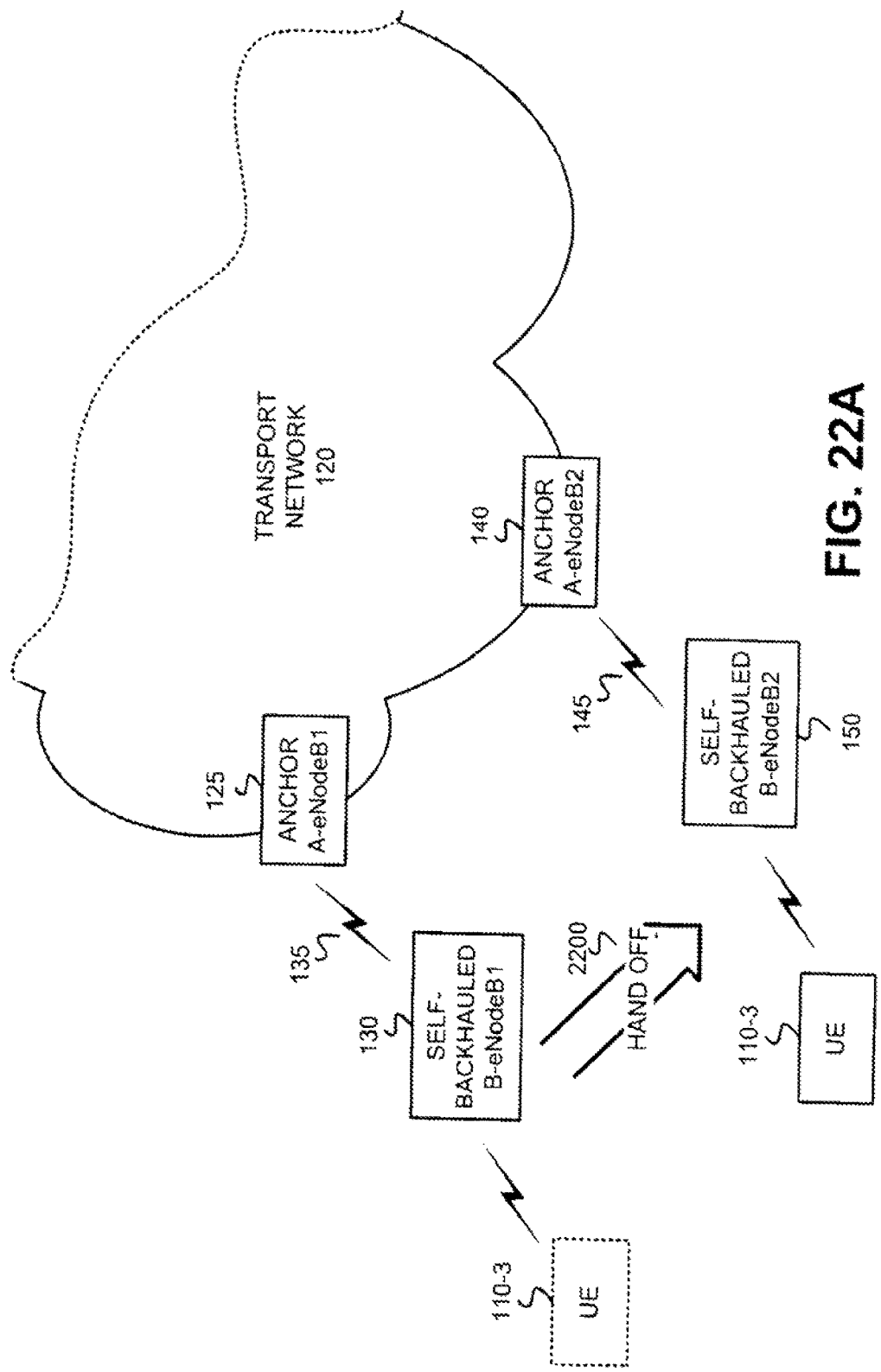
FIGS. 22A and 22B depict an exemplary handoff of a UE from a first self-backhauled eNodeB to a second self-backhauled eNodeB in a wireless communications system.
Figure 22B:
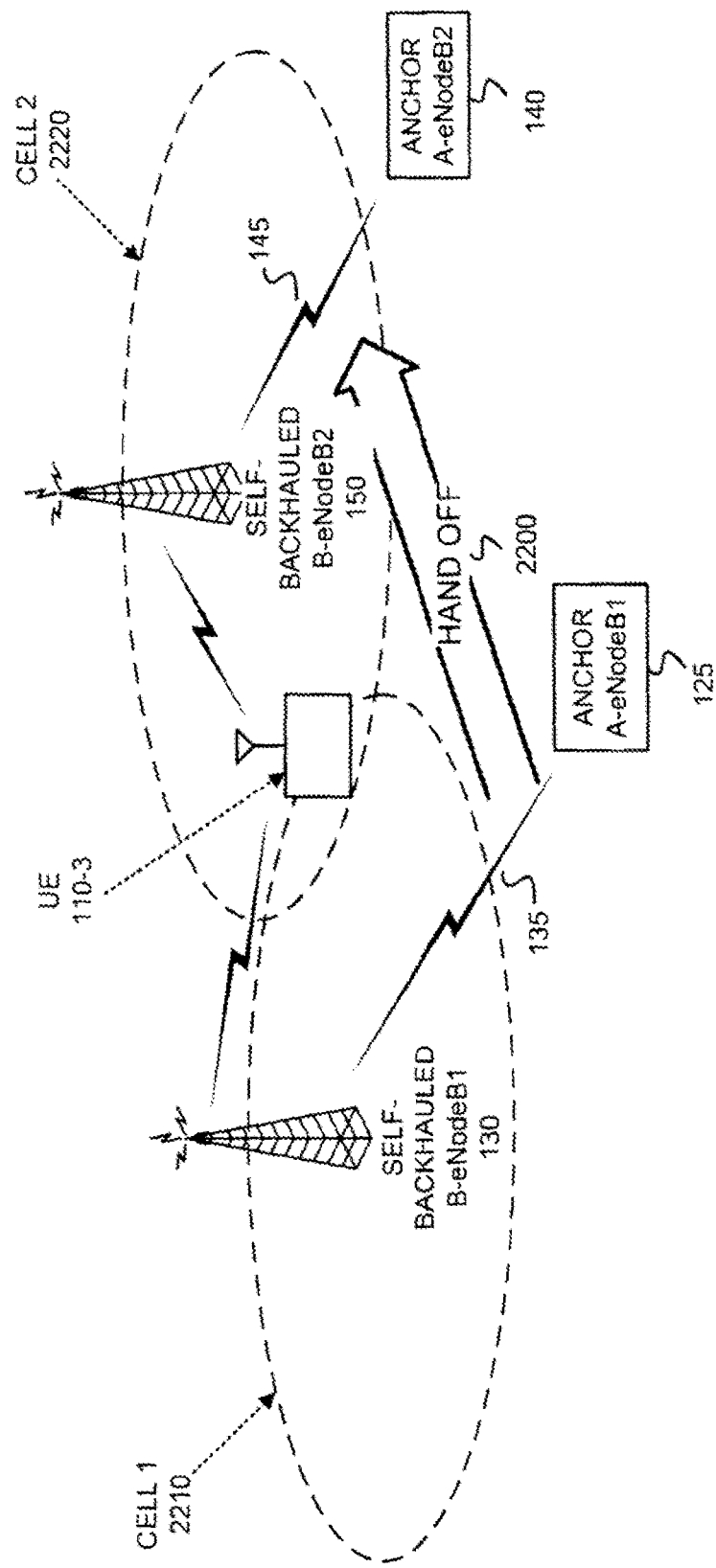

FIGS. 22A and 22B depict an example of UE mobility where UE 110-3 may be handed of from self-backhauled eNodeB 130 to self-backhauled eNodeB 150. As shown in FIGS. 20A and 20B. UE 110-3 initially may reside in cell 1 2210 that is served by self-backhauled eNodeB 130 via radio interface 135 and anchor eNodeB 125. However, upon entry of UE 110-3 into cell 2 2220 that is served by self-backhauled eNodeB 150 via radio interface 145 and anchor eNodeB 140, UE 110-3 may be handed off 2200 to self-backhauled eNodeB 150. As shown in FIGS. 22A and 22B, self-backhauled eNodeB 150 may connect to transport network 120 via radio interface 145 and anchor eNodeB 140. Subsequent to hand off 2200, self-backhauled eNodeB 150 may serve UE 110-3 via radio interface 145 and anchor eNodeB 140 while UE 110-3 is located in cell 2 2220.

In the example of UE mobility depicted in FIGS. 22A and 22B, and further where the UE mows to a target self-backhauled eNodeB (e.g., B-eNodeB2 150) which has a serving S-GW that is different from the S-GW of the serving self-backhauled eNodeB (e.g., B-eNodeB1 130), then the MME may need to establish new associations between the serving S-GW of the UE and the serving S-GW of the target B-eNodeB and, at the same time, remove the association toward the S-GW of the source B-eNodeB. The reconfiguration of these associations may involve the establishment of new GTP tunnels between the two S-GWs and reconfiguration of packet filters.

A solution to handle the chime of S-GW at the change of B-eNodeB may be to maintain multiple IP addresses for the B-eNodeB (and, thereby, multiple serving S-GWs) and use the S-GW that collocates with the S-GW serving the actual UE. By maintaining multiple IP addresses of the S-GW of the B-eNodeB (e.g., one IP address at each S-GW in the network), the S-GW serving the particular UE may always be collocated with the S-GW serving the UE. Handling of S-GW mobility, thus, becomes easier since the MME may only need to determine what is the IP address of the B-eNodeB at the particular S-GW that serves the UE).

Another situation that may occur during UE mobility is that the target self-backhauled eNodeB may have a different serving MME than the source self-backhauled eNodeB (the S-GW may or may not change together with the change of MME). In this situation, the serving MME of the UE may communicate with the serving MME of the target B-eNodeB to request far the modification of B-eNodeB bearers to support the QoS needs of the UE and/or to request the reconfiguration of the S-GW filters/tunnels, especially in the case of S-GW change.

A further mobility situation may occur when the UE changes serving MMEs and possibly also serving S-GWs. In this situation, the old MME may transfer information as pan of the UE context that may be used for the target MME to establish the necessary associations toward the S-GW of the B-eNodeB and the association between the S-GW of the UE and that of the B-eNodeB.

Yet another mobility situation may occur if both the S-GW serving the UE and the S-GW and MME serving the B-eNodeB change at the same time during UE mobility. In this situation, the context transfer may occur at both MMEs MME of UE and MME of B-eNodeB) and the MME serving the UE may create a binding to the appropriate B-eNodeB.

In a Luther enhancement of mobility handling, bearer resources supporting the backhaul link in the source and target B-eNodeB may be updated upon UE mobility such that, for example, resources may be released at the source and resources may be reserved at the target according to the QoS needs of the UE involved in the handover. The MME serving the EX may communicate with the MME serving the source and target. B-eNodeBs to request the update of bearers accordingly. The packet filters at the S-GWs may also need to be updated accordingly.

Figure 23A:
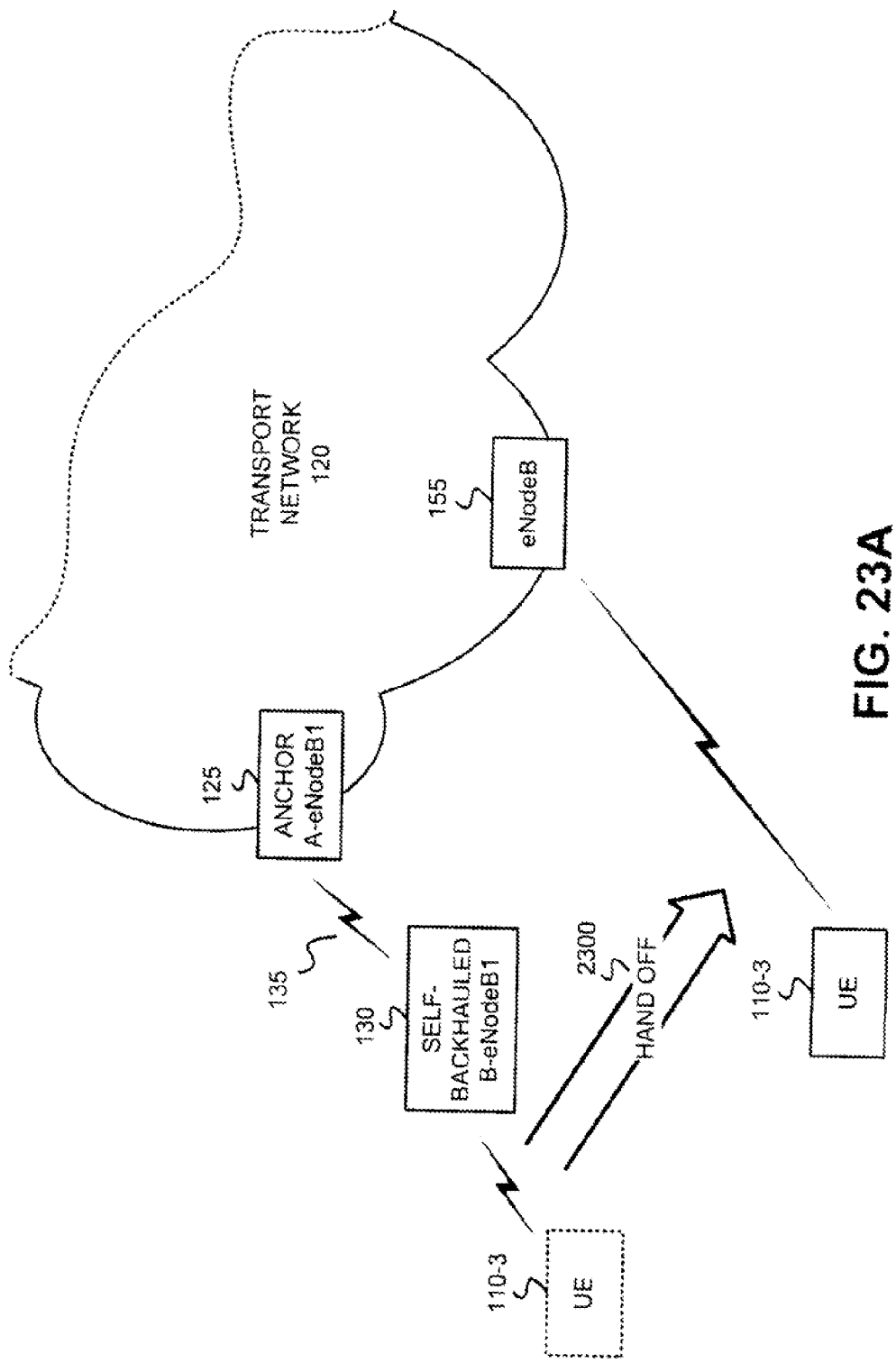
FIGS. 23A and 23B depict an exemplary handoff of a UE from a self-backhauled eNodeB to an eNodeB in a wireless communications system.
Figure 23B:
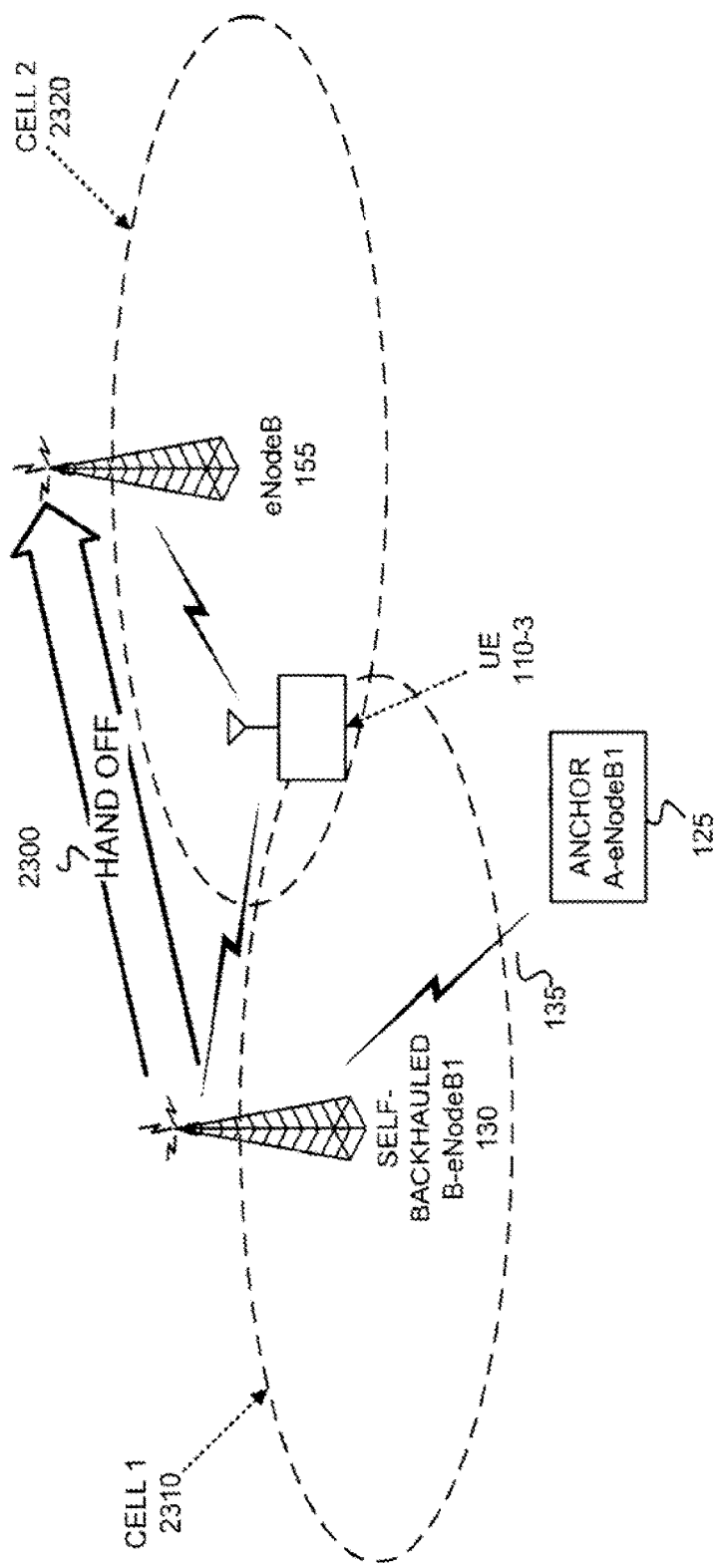

FIGS. 23A and 23B depict an example of UE mobility where UE 110-3 may be handed off from self-backhauled eNodeB 130 to an eNodeB that is not a self-backhauled eNodeB eNodeB 155). As shown in FIGS. 23A and 23B, UE 110-3 initially may reside in cell 1 2310 that is served by self-backhauled eNodeB 130 via radio interface 135 and anchor eNodeB 125. However, upon entry of UE 110-3 into cell 2 2320 that is served by eNodeB 155. UE 110-3 may be handed off 2300 to eNodeB 155. As shown in FIG. 21A, eNodeB 155 may reside in transport network 120. Subsequent to hand off 2300, eNodeB 155 may serve UE 110-3 while UE 110-3 is located in cell 2 2320.

A few actions may need to be performed during B-eNodeB set-up/configuration to facilitate the exemplary embodiments described above. The MME serving the B-eNodeB may set-up and configure the bearers (with different QoS characteristics) that support the backhaul link of the self-backhauled eNodeB, including the configuration of packet filters in the S-GW function associated with the B-eNodeB (applicable to the exemplary embodiments of FIGS. 4-5 and 8-9) or the configuration of such filters in the anchor eNodeB (applicable to the exemplary embodiment of FIGS. 14-17). The MME may also establish a separate bearer for the self-backhauled eNodeB to be used to carry control traffic to/from the self-backhauled eNodeB on the S1 and X2 interfaces and to configure the corresponding classification/filtering rules. If tunneling is used to route packets between the S-GW serving the UE and the S-GW serving the B-eNodeB (applicable to the exemplars embodiments of FIGS. 4-5 and 8-9), then one GTP tunnel may be established between the two S-GW nodes corresponding to each bearer of the B-eNodeB. Additionally, a separate GTP tunnel may be set-up between two S-GW nodes that server two B-eNodeBs which have an X2 interface in between, where the GTP tunnel may carry the X2 signaling traffic (applicable to the exemplary embodiments of FIGS. 4-5 and 8-9). A GTP tunnel may also be established between the S-GW serving the B-eNodeB and the MME to which the B-eNodeB has an S1 interface (applicable to the exemplary embodiments of FIGS. 4-5 and 8-9), where the GTP tunnel may be used to carry the S1 signaling traffic to/from the eNodeB.

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 6A, 6B, 10A, 10B and 18, the order of the blocks may be modified in other implementations consistent with the principles of the invention. Further, non-dependent blocks may be performed in parallel.

Aspects of the invention may also be implemented in methods and/or computer program products. Accordingly, the invention may be embodied in hardware and/or in software (including firmware, resident software, microcode, etc.). Furthermore, the invention may take the limn of a computer program product on a computer-usable or computer-readable software medium having computer-usable or computer-readable program code embodied in the medium for use by or in connection with an instruction execution system. The actual software code or specialized control hardware used to implement the embodiments described herein is not limiting of the invention. Thus, the operation and behavior of the embodiments were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, or a combination of hardware and software.

Even though particular combinations of features are recited in the claims and/or disclosed in the specification, these combinations are not intended to limit the invention. In fact, many of these features ma be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A method, comprising:
receiving, at a serving gateway in a transport network, a packet destined for a self-backhauled eNodeB, wherein the serving gateway is addressed by an internet protocol (IP) address associated with the self-backhauled eNodeB, and wherein the self-backhauled eNodeB is an eNodeB that is connected to the transport network via a radio connection to an anchor eNodeB;
mapping the packet to a bearer associated with a self-backhauled link to the self-backhauled eNodeB;
encapsulating the packet to a General Packet Radio Service (GPRS) Tunneling Protocol (GTP) tunnel associated with the bearer; and
sending the encapsulated packet toward the self-backhauled eNodeB.

2. The method of claim 1, wherein the serving gateway addressed by the IP address associated with the self-backhauled eNodeB is integrated into the anchor eNodeB.

3. The method of claim 1, where the serving gateway addressed by the IP address associated with the self-backhauled eNodeB maps incoming packets to self-backhauled bearers:
based on different IP addresses used by the self-backhauled eNodeB for different self-backhauled bearers;
based on transport network Quality of Service (QoS) indicators contained in headers of incoming packets;
based on identifying a user equipment (UE) bearer by looking into an inner tunneling header in the incoming packets; or
based on using tunneling between the serving gateway of the UE and the serving gateway addressed by the IP address associated with the self-backhauled eNodeB.

4. The method of claim 1, where a serving gateway of a user equipment (UE) that is connected to the self-backhauled eNodeB indicates, in packets sent to the self-backhauled eNodeB, to which the self-backhauled bearer the packets should be mapped in the serving gateway addressed by the IP address associated with the self-backhauled eNodeB, where the indication is achieved by:
using a different IP address of the self-backhauled eNodeB for each self-backhauled bearer;
using transport network Quality of Service (QoS) indicators contained in headers of the packets; or
using tunneling between the serving gateway of the UE and the serving gateway addressed by the IP address associated with the self-backhauled eNodeB.

5. The method of claim 4, where the self-backhauled eNodeB indicates for the serving gateway of the UE which self-backhauled bearer the serving gateway of the UE should use for a given UE bearer by:
indicating an IP address corresponding to the given self-backhauled bearer; or
indicating the transport network QoS codepoint corresponding to the given self-backhauled bearer.

6. The method of claim 1, wherein bearers of the self-backhauled eNodeB are established during the configuration and initial setup of the self-backhauled eNodeB.

7. A method, comprising:
receiving, at a first gateway in a transport network, a packet destined for a user equipment (UE) that is being served by a self-backhauled eNodeB, wherein the self-backhauled eNodeB is an eNodeB that is connected to the transport network via a radio connection to an anchor eNodeB;
classifying the packet to map the packet to a bearer associated with the UE based on the classification;
encapsulating the packet using a tunneling protocol to tunnel the packet towards the anchor eNodeB that will transmit the packet to the self-backhauled eNodeB via a radio interface; and
sending the packet to an Internet Protocol (IP) address associated with the self-backhauled eNodeB such that the packet is IP routed to a second gateway in the transport network that serves the self-backhauled eNodeB.

8. The method of claim 7, where the tunneling protocol comprises a General Packet Radio Service (GPRS) Tunneling Protocol (GTP).

9. The method of claim 7, further comprising:
encapsulating the packet to a second tunnel at the second gateway; and
sending the encapsulated packet to the anchor eNodeB.

10. The method of claim 7, further comprising:
mapping the first tunnel into a bearer associated with the self-backhauled eNodeB;
encapsulating the packet into a second tunnel based on the mapped bearer,
wherein using the tunneling protocol to tunnel the encapsulated packet further comprises:
tunneling the encapsulated packet towards the anchor eNodeB using the second tunnel.

11. The method of claim 7, further comprising:
integrating gateway functionality associated with the self-backhauled eNodeB into the anchor eNodeB.

12. The method of claim 11, wherein sending the packet to the address associated with the self-backhauled eNodeB is performed such that the packet is IP routed to the anchor eNodeB.

13. A serving gateway in a transport network comprising a network interface and a processor for performing packet classification and mapping, wherein the network interface is configured to:

receive a packet destined for a self-backhauled eNodeB, wherein the serving gateway is addressed by an internet protocol (IP) address associated with the self-backhauled eNodeB, and wherein the self-backhauled eNodeB is an eNodeB that is connected to the transport network via a radio connection to an anchor eNodeB; and the processor is configured to:

map the packet to a bearer associated with a self-backhauled link to the self-backhauled eNodeB and encapsulate the packet to a General Packet Radio Service (GPRS) Tunneling Protocol (GTP) tunnel associated with the bearer; and the network interface is further configured to send the encapsulated packet toward the self-backhauled eNodeB.

14. The serving gateway of claim 13, wherein the serving gateway is integrated with the anchor eNodeB.

15. The serving gateway of claim 13, wherein the processor is further configured to map incoming packets to self-backhauled bearers:

based on different IP addresses used by the self-backhauled eNodeB for different self-backhauled bearers;

based on transport network Quality of Service (QoS) indicators contained in headers of incoming packets;

based on identifying a user equipment (UE) bearer by looking into an inner tunneling header in the incoming packets; or based on using tunneling between the serving gateway of the UE and the serving gateway addressed by the IP address associated with the self-backhauled eNodeB.

16. The serving gateway of claim 13, further configured to receive an indication from a serving gateway of a user equipment (UE) that is connected to the self-backhauled eNodeB, wherein the indication indicates, in packets sent to the self-backhauled eNodeB, to which the self-backhauled bearer the packets should be mapped in the serving gateway addressed by the IP address associated with the self-backhauled eNodeB, where the indication is achieved by:

using a different IP address of the self-backhauled eNodeB for each self-backhauled bearer;

using transport network Quality of Service (QoS) indicators contained in headers of the packets; or using tunneling between the serving gateway of the UE and the serving gateway addressed by the IP address associated with the self-backhauled eNodeB.

17. The serving gateway of claim 16, where the self-backhauled eNodeB indicates for the serving gateway of the UE which self-backhauled bearer the serving gateway of the UE should use for a given UE bearer by:

indicating an IP address corresponding to the given self-backhauled bearer; or indicating the transport network QoS codepoint corresponding to the given self-backhauled bearer.

18. The serving gateway of claim 13, wherein bearers of the self-backhauled eNodeB are established during the configuration and initial setup of the self-backhauled eNodeB.

19. A serving gateway in a transport network, comprising a network interface and a processor for packet classification and mapping, wherein the network interface is configured to: receive a packet destined for a user equipment (UE) that is being served by a self-backhauled eNodeB, wherein the self-backhauled eNodeB is an eNodeB that is connected to the transport network via a radio connection to an anchor eNodeB; and wherein the processor is configured to:

classify the packet and to map the packet to a bearer associated with the UE based on the classification;

encapsulate the packet using a tunneling protocol to tunnel the packet towards the anchor eNodeB that will transmit the packet to the self-backhauled eNodeB via a radio interface; and send, via the network interface, the packet to an Internet Protocol (IP) address associated with the self-backhauled eNodeB such that the packet is IP routed to a second gateway in the transport network that serves the self-backhauled eNodeB.

20. The serving gateway of claim 19, where the tunneling protocol comprises a General Packet Radio Service (GPRS) Tunneling Protocol (GTP).

21. The serving gateway of claim 19, wherein the processor is further configured to encapsulate the packet to a second tunnel at the second gateway, and send the encapsulated packet to the anchor eNodeB.

22. The serving gateway of claim 19, wherein the processor is further configured to map the first tunnel into a bearer associated with the self-backhauled eNodeB, and encapsulate the packet into a second tunnel based on the mapped bearer, wherein using the tunneling protocol to tunnel the encapsulated packet further comprises:

tunneling the encapsulated packet towards the anchor eNodeB using the second tunnel.

23. The serving gateway of claim 19, wherein the serving gateway is integrated with the self-backhauled eNodeB and the anchor eNodeB.

24. The serving gateway of claim 16, wherein sending the packet to the address associated with the self-backhauled eNodeB is performed such that the packet is IP routed to the anchor eNodeB.

* * * * *

UNITED STATES PATENT AND TRADEMARK OFFICE
CERTIFICATE OF CORRECTION

PATENT NO. : 9,769,797 B2
APPLICATION NO. : 14/449107
DATED : September 19, 2017
INVENTOR(S) : Johansson et al.

It is certified that error appears in the above-identified patent and that said Letters Patent is hereby corrected as shown below:

On the Title Page

In Item (54), in Title, in Column 1, Line 1, delete "SELF BACKHAULING" and insert -- SELF-BACKHAULING --, therefor.

In Item (72), under "Inventors", in Column 1, Line 2, delete "Spånga" and insert -- Spånga --, therefor.

In Item (72), under "Inventors", in Column 1, Line 3, delete "András Ràcz," and insert -- András Rácz, --, therefor.

In the Drawings

In Fig. 7, Sheet 9 of 28, delete "P26279WO1".

In the Specification

In Column 1, in Title, Line 1, delete "SELF BACKHAULING" and insert -- SELF-BACKHAULING --, therefor.

In Column 1, Line 3, delete "U.S.C." and insert -- U.S.C. § --, therefor.

In Column 1, Line 6, delete "2010," and insert -- 2010, now Pat. No. 8,797,952, --, therefor.

In Column 1, Line 11, delete "entitled." and insert -- entitled --, therefor.

In Column 1, Line 20, delete "self backhauled" and insert -- self-backhauled --, therefor.

In Column 1, Line 26, delete "evolved 30" and insert -- evolved 3G --, therefor.

In Column 1, Line 38, delete "pan" and insert -- part --, therefor.

Signed and Sealed this
Eighteenth Day of September, 2018

Andrei Iancu
*Director of the United States Patent and Trademark Office*

In Column 2, Line 51, delete "employing," and insert -- employing --, therefor.

In Column 2, Lines 53-54, delete "short. While" and insert -- short, while --, therefor.

In Column 2, Line 56, delete "itself" and insert -- itself, --, therefor.

In Column 3, Line 2, delete "used fix" and insert -- used for --, therefor.

In Column 3, Line 14, delete "an IT" and insert -- an IP --, therefor.

In Column 3, Lines 16-17, delete "as solution" and insert -- a solution --, therefor.

In Column 3, Line 28, delete "any further" and insert -- may further --, therefor.

In Column 3, Line 36, delete "tiny include" and insert -- may include --, therefor.

In Column 3, Line 37, delete "(UP" and insert -- (UE) --, therefor.

In Column 3, Line 40, delete "may thither" and insert -- may further --, therefor.

In Column 3, Line 41, delete "tunneling," and insert -- tunneling --, therefor.

In Column 3, Line 49, delete "far" and insert -- for --, therefor.

In Column 3, Line 50, delete "farther" and insert -- further --, therefor.

In Column 3, Line 66, delete "any be" and insert -- may be --, therefor.

In Column 4, Line 10, delete "them an" and insert -- from an --, therefor.

In Column 4, Line 27, delete "UP of" and insert -- UE of --, therefor.

In Column 4, Line 51, delete "10B:" and insert -- 10B; --, therefor.

In Column 4, Line 61, delete "embodiment," and insert -- embodiment --, therefor.

In Column 5, Line 9, delete "exemplify" and insert -- exemplary --, therefor.

In Column 5, Line 22, delete "identity" and insert -- identify --, therefor.

In Column 5, Lines 52-53, delete "eNodeBs eNodeB 155" and insert -- eNodeBs (e.g., eNodeB 155 --, therefor.

In Column 5, Line 67, delete "Additionally." and insert -- Additionally, --, therefor.

In Column 6, Line 12, delete "treatment," and insert -- treatment. --, therefor.

In Column 6, Line 24, delete "leer" and insert -- for --, therefor.

In Column 6, Line 36, delete "120" and insert -- 120. --, therefor.

In Column 6, Line 44, delete "device NO" and insert -- device 200 --, therefor.

In Column 6, Line 46, delete "circuitry the" and insert -- circuitry for --, therefor.

In Column 6, Line 49, delete "troy" and insert -- may --, therefor.

In Column 6, Line 65, delete "the illustrative" and insert -- for illustrative --, therefor.

In Column 6, Line 67, delete "tiny be" and insert -- may be --, therefor.

In Column 7, Line 3, delete "output," and insert -- output --, therefor.

In Column 7, Line 14, delete "semi-permanent" and insert -- semi-permanent, --, therefor.

In Column 7, Line 17, delete "ROM." and insert -- ROM, --, therefor.

In Column 7, Line 18, delete "impede" and insert -- magnetic --, therefor.

In Column 7, Line 26, delete "tiny" and insert -- may --, therefor.

In Column 7, Line 38, delete "(Or" and insert -- for --, therefor.

In Column 7, Line 40, delete "thither" and insert -- further --, therefor.

In Column 7, Line 53, delete "as speaker" and insert -- a speaker --, therefor.

In Column 7, Line 54, delete "(Or" and insert -- for --, therefor.

In Column 7, Line 55, delete "345 of" and insert -- 345 (e.g., of --, therefor.

In Column 7, Line 62, delete "my be" and insert -- may be --, therefor.

In Column 8, Line 3, delete "muted" and insert -- routed --, therefor.

In Column 8, Line 13, delete "tunneling in" and insert -- tunneling. In --, therefor.

In Column 8, Line 20, delete "exemplify" and insert -- exemplary --, therefor.

In Column 8, Line 25, delete "exemplify" and insert -- exemplary --, therefor.

In Column 8, Line 50, delete "63" and insert -- 6B --, therefor.

In Column 8, Line 58, delete "exemplify" and insert -- exemplary --, therefor.

In Column 9, Line 7, delete "OFF tunnels." and insert -- GTP tunnels. --, therefor.

In Column 9, Line 9, delete "muted" and insert -- routed --, therefor.

In Column 9, Line 18, delete "napping" and insert -- mapping --, therefor.

In Column 9, Line 21, delete "transport/" and insert -- transport --, therefor.

In Column 9, Line 23, delete "up." and insert -- UE). --, therefor.

In Column 9, Line 28, delete "Misery" and insert -- Diffserv --, therefor.

In Column 9, Line 31, delete "set-up" and insert -- set-up. --, therefor.

In Column 9, Line 34, delete "(TEED)" and insert -- (TEID) --, therefor.

In Column 9, Line 43, delete "LE." and insert -- UE. --, therefor.

In Column 9, Line 44, delete "DiffServ" and insert -- Diffserv --, therefor.

In Column 9, Line 51, delete "mopped" and insert -- mapped --, therefor.

In Column 9, Line 55, delete "far the" and insert -- for the --, therefor.

In Column 9, Line 62, delete "(black" and insert -- (block --, therefor.

In Column 9, Line 64, delete "B-eNode" and insert -- B-eNodeB --, therefor.

In Column 9, Line 65, delete "mop" and insert -- map --, therefor.

In Column 10, Line 10, delete "fir the" and insert -- for the --, therefor.

In Column 10, Lines 11-12, delete "tunneling, in" and insert -- tunneling. In --, therefor.

In Column 10, Line 19, delete "B-eNodeB 130." and insert -- B-eNodeB1 130. --, therefor.

In Column 10, Line 23, delete "handoff a" and insert -- handoff of a --, therefor.

In Column 10, Line 26, delete "ma have" and insert -- may have --, therefor.

In Column 10, Line 61, delete "alto" and insert -- into --, therefor.

CERTIFICATE OF CORRECTION (continued)
U.S. Pat. No. 9,769,797 B2

In Column 11, Line 36, delete "and imp" and insert -- and map --, therefor.

In Column 11, Line 38, delete "based or" and insert -- based on --, therefor.

In Column 11, Line 47, delete "as same" and insert -- a same --, therefor.

In Column 11, Line 49, delete "bearer, CP" and insert -- bearer. CP --, therefor.

In Column 11, Line 59, delete "muting" and insert -- routing --, therefor.

In Column 12, Line 2, delete "MME. 165-1" and insert -- MME 165-1 --, therefor.

In Column 12, Line 4, delete "CT protocol" and insert -- CP protocol --, therefor.

In Column 12, Lines 8-9, delete "A-eNodeB 125)," and insert -- A-eNodeB1 125), --, therefor.

In Column 12, Line 23, delete "treatments higher" and insert -- treatments (e.g., higher --, therefor.

In Column 12, Line 29, delete "muter" and insert -- router --, therefor.

In Column 12, Lines 36-37, delete "functionality S-GW 160-2)" and insert -- functionality (e.g., S-GW 160-2) --, therefor.

In Column 12, Line 58, delete "130" and insert -- 130) --, therefor.

In Column 13, Line 9, delete "nay be" and insert -- may be --, therefor.

In Column 13, Line 30, delete "used fir" and insert -- used for --, therefor.

In Column 13, Line 60, delete "and imp" and insert -- and map --, therefor.

In Column 13, Line 63, delete "hawks) 1935" and insert -- tunnel(s) --, therefor.

In Column 13, Line 64, delete "nipping the packets to beater(s)" and insert -- mapping the packets to bearer(s) --, therefor.

In Column 13, Line 67, delete "tunnel(s) 1950." and insert -- tunnel(s). --, therefor.

In Column 14, Line 8, delete "tinny" and insert -- many --, therefor.

In Column 14, Line 19, delete "imps the" and insert -- maps the --, therefor.

In Column 14, Line 27, delete "mates" and insert -- creates --, therefor.

In Column 14, Line 60, delete "as second" and insert -- a second --, therefor.

CERTIFICATE OF CORRECTION (continued)
U.S. Pat. No. 9,769,797 B2

In Column 14, Line 67, delete "handed of" and insert -- handed off --, therefor.

In Column 15, Line 2, delete "20B." and insert -- 20B, --, therefor.

In Column 15, Line 15, delete "mows" and insert -- moves --, therefor.

In Column 15, Line 26, delete "chime" and insert -- change --, therefor.

In Column 15, Line 43, delete "far the" and insert -- for the --, therefor.

In Column 15, Line 49, delete "pan" and insert -- part --, therefor.

In Column 15, Lines 57-58, delete "MMEs MME" and insert -- MMEs (i.e., MME --, therefor.

In Column 15, Line 60, delete "Luther" and insert -- further --, therefor.

In Column 15, Line 66, delete "EX may" and insert -- UE may --, therefor.

In Column 15, Line 67, delete "target." and insert -- target --, therefor.

In Column 16, Line 6, delete "eNodeB eNodeB" and insert -- eNodeB (e.g., eNodeB --, therefor.

In Column 16, Line 10, delete "eNodeB 155. UE" and insert -- eNodeB 155, UE --, therefor.

In Column 16, Line 31, delete "exemplars" and insert -- exemplary --, therefor.

In Column 16, Line 43, delete "eNodeB." and insert -- B-eNodeB. --, therefor.

In Column 16, Line 58, delete "limn" and insert -- form --, therefor.

In Column 16, Line 60, delete "software" and insert -- storage --, therefor.

In Column 17, Line 12, delete "ma be" and insert -- may be --, therefor.